US009839029B2

(12) United States Patent
Nagata et al.

(10) Patent No.: US 9,839,029 B2
(45) Date of Patent: Dec. 5, 2017

(54) RADIO BASE STATION, USER TERMINAL AND RADIO COMMUNICATION METHOD

(71) Applicant: NTT DOCOMO, Inc., Tokyo (JP)

(72) Inventors: Satoshi Nagata, Tokyo (JP); Xiaolin Hou, Beijing (CN); Chongning Na, Beijing (CN); Atsushi Harada, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/772,400

(22) PCT Filed: Feb. 13, 2014

(86) PCT No.: PCT/JP2014/053268
§ 371 (c)(1),
(2) Date: Sep. 3, 2015

(87) PCT Pub. No.: WO2014/136542
PCT Pub. Date: Sep. 12, 2014

(65) Prior Publication Data
US 2016/0007347 A1    Jan. 7, 2016

(30) Foreign Application Priority Data
Mar. 7, 2013    (JP) .................................. 2013-045868

(51) Int. Cl.
*H04W 72/04*    (2009.01)
*H04J 3/00*    (2006.01)
(Continued)

(52) U.S. Cl.
CPC ........... *H04W 72/0446* (2013.01); *H04J 3/00* (2013.01); *H04W 16/30* (2013.01);
(Continued)

(58) Field of Classification Search
CPC ......... H04W 72/0446; H04W 72/0453; H04W 72/082; H04W 72/042; H04W 16/30
See application file for complete search history.

(56) References Cited

U.S. PATENT DOCUMENTS

| 2008/0159249 | A1* | 7/2008 | Takahashi ............. | H04L 5/0005 370/343 |
| 2010/0034157 | A1* | 2/2010 | Stolyar ............... | H04W 52/244 370/329 |

(Continued)

FOREIGN PATENT DOCUMENTS

| EP | 2603027 A1 | 6/2013 |
| WO | 2012028025 A1 | 3/2012 |

(Continued)

OTHER PUBLICATIONS

International Search Report issued in corresponding application No. PCT/JP2014/053268 dated Apr. 22, 2014 (1 page).

(Continued)

*Primary Examiner* — Gbemileke J Onamuti
(74) *Attorney, Agent, or Firm* — Osha Liang LLP

(57) ABSTRACT

A radio base station capable of reducing the impact of interference and improving the efficiency of the use of radio resources even when different DL/UL configurations are employed between neighboring transmitting/receiving points is disclosed. The radio base station can communicate with user terminals via time division duplex and is able to change and control DL/UL configurations, has a subframe type determining section that classifies subframes into fixed subframes or flexible subframes, in accordance with the relationship between the DL/UL configurations that are employed in the radio base station and the DL/UL configurations that are employed in other radio base stations, and a frequency allocation control section that applies mutually (Continued)

different frequency allocation methods to the fixed subframes and the flexible subframes.

12 Claims, 31 Drawing Sheets

(51) Int. Cl.
  *H04W 72/08* (2009.01)
  *H04W 16/30* (2009.01)
(52) U.S. Cl.
  CPC ..... *H04W 72/042* (2013.01); *H04W 72/0453* (2013.01); *H04W 72/082* (2013.01)

(56) References Cited

U.S. PATENT DOCUMENTS

| | | | | |
|---|---|---|---|---|
| 2013/0114525 | A1* | 5/2013 | Ahmadi | H04L 5/0053 370/329 |
| 2014/0086076 | A1* | 3/2014 | Yang | H04W 24/10 370/252 |
| 2014/0160967 | A1* | 6/2014 | Gao | H04W 24/10 370/252 |
| 2014/0161001 | A1* | 6/2014 | Gao | H04W 72/0446 370/280 |
| 2014/0161003 | A1* | 6/2014 | Han | H04W 52/146 370/280 |
| 2014/0169328 | A1 | 6/2014 | Ahimezawa et al. | |
| 2015/0358983 | A1* | 12/2015 | Frenger | H04L 1/0006 370/329 |
| 2016/0081071 | A1* | 3/2016 | Song | H04L 1/00 370/280 |

FOREIGN PATENT DOCUMENTS

| | | |
|---|---|---|
| WO | 2012/169815 A2 | 12/2012 |
| WO | 2013/014169 A1 | 1/2013 |
| WO | 2013004007 A1 | 1/2013 |
| WO | 2013/018612 A1 | 2/2013 |

OTHER PUBLICATIONS

Qualcomm Incorporated, "Interference mitigation schemes"; 3GPP TSG RAN WG1 Meeting #72, R1-130586; St. Julian's, Malta, Jan. 28-Feb. 1, 2013 (5 pages).

Samsung, "Power control in flexible subframes for eIMTA"; 3GPP TSG RAN WG1 #72, R1-130290; St. Julian's, Malta, Jan. 28- Feb. 1, 2013 (3 pages).

3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Office Action issued in corresponding Japanese Application No. 2013-045868, dated Oct. 27, 2015 (7 pages).

Huawei et al.; "Potential signaling enhancements for TDD eIMTA"; 3GPP TSG RAN WG1 #72, R1-130445; St. Julian's, Malta, Jan. 28-Feb. 1, 2013 (6 pages).

Office Action issued in corresponding Japanese Application No. 2013-045868, dated Feb. 23, 2016 (11 pages).

Extended European Search Report in counter European Patent Application No. 14759546.6, dated Sep. 13, 2016 (10 pages).

Catt; "Interference Mitigation Schemes for TDD eIMTA"; 3GPP TSG RAN WG1 Meeting #72, R1-130049; St. Julian's, Malta, Jan. 28-Feb. 1, 2013 (4 pages).

Office Action issued in the counterpart European Patent Application No. 14759546.6, dated Jun. 26, 2017 (5 pages).

\* cited by examiner

| DL/UL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

▨ DL SUBFRAME  ▨ SPECIAL SUBFRAME  ▥ UL SUBFRAME

FIG.1

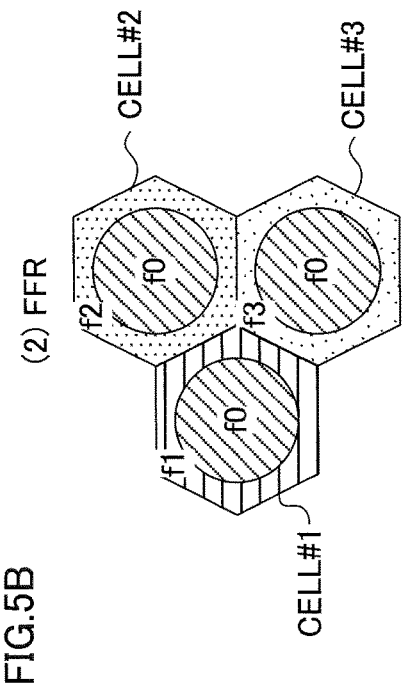
FIG.5A  (1) ORTHOGONAL FREQUENCY REUSE
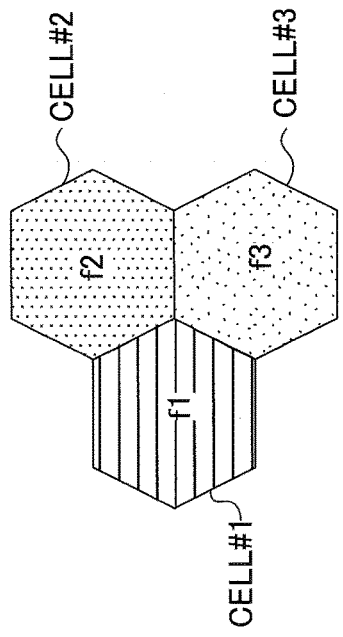
FIG.5B  (2) FFR
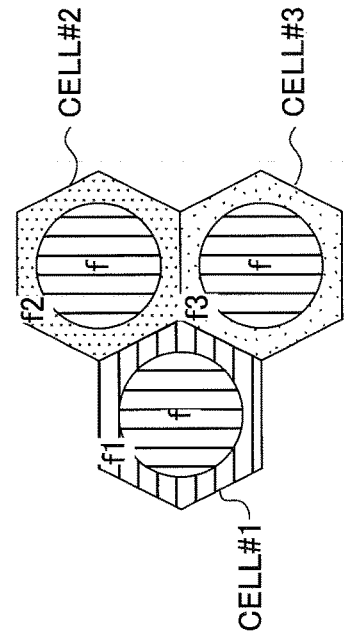
FIG.5C  (3) SFR
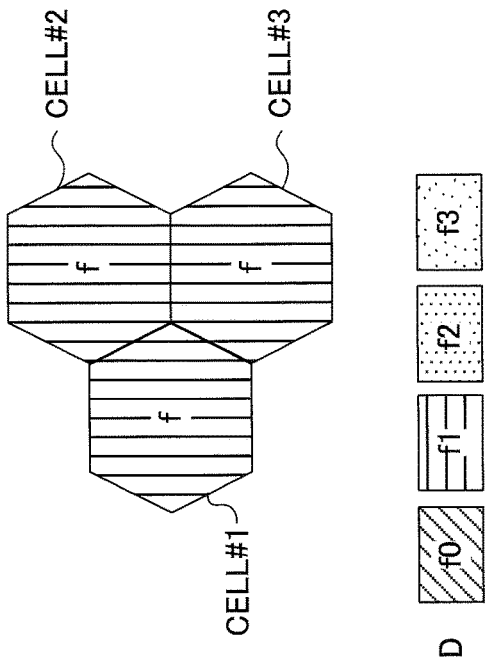
FIG.5D  (4) CO-CHANNEL DEPLOYMENT
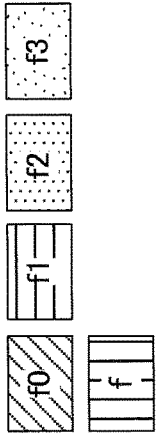

| | | B. FLEXIBLE SUBFRAMES | | | |
|---|---|---|---|---|---|
| IMPACT OF INTERFERENCE BETWEEN RADIO BASE STATIONS (1)<(2)<(3)<(4) SMALL ↔ LARGE | | (4) CO-CHANNEL | (3) SFR | (2) FFR | (1) ORTHOGONAL FREQUENCY REUSE |
| A. FIXED SUBFRAMES | (4) CO-CHANNEL | | | | |
| | (3) SFR | | THIRD EXAMPLE | SECOND EXAMPLE | FIRST EXAMPLE |
| | (2) FFR | | SIXTH EXAMPLE | FIFTH EXAMPLE | FOURTH EXAMPLE |
| | (1) ORTHOGONAL FREQUENCY REUSE | | | EIGHTH EXAMPLE | SEVENTH EXAMPLE |

FIG.6

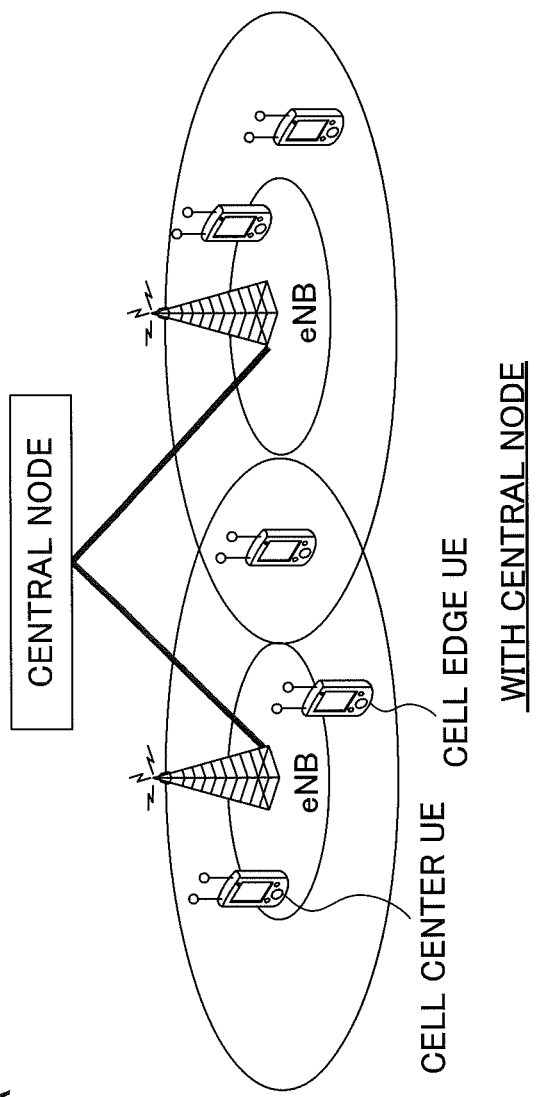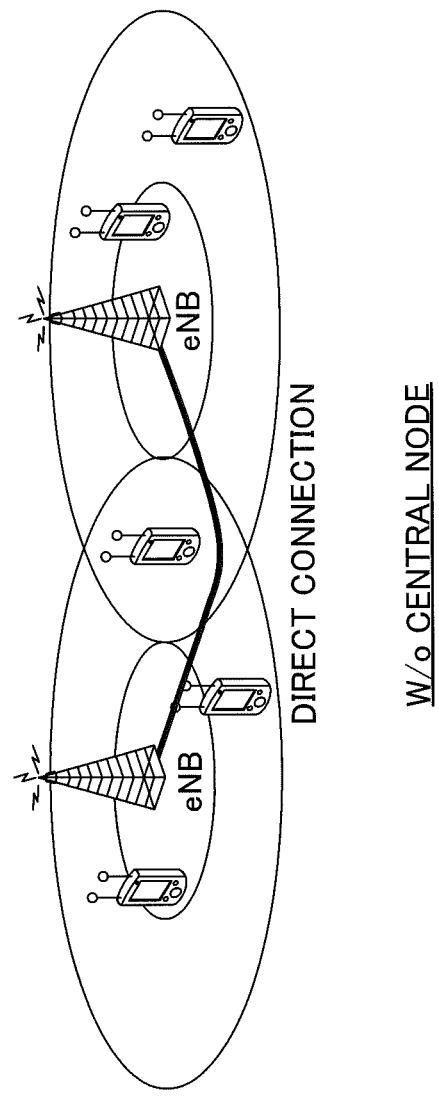

WITH CENTRAL NODE

W/o CENTRAL NODE

図10A
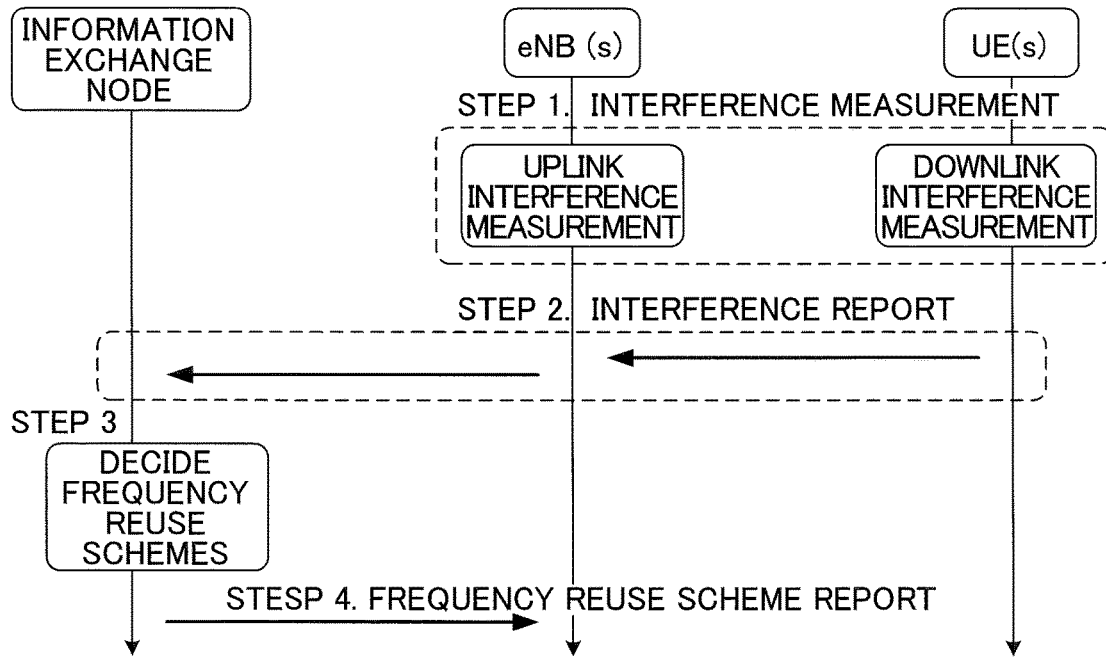
図10B
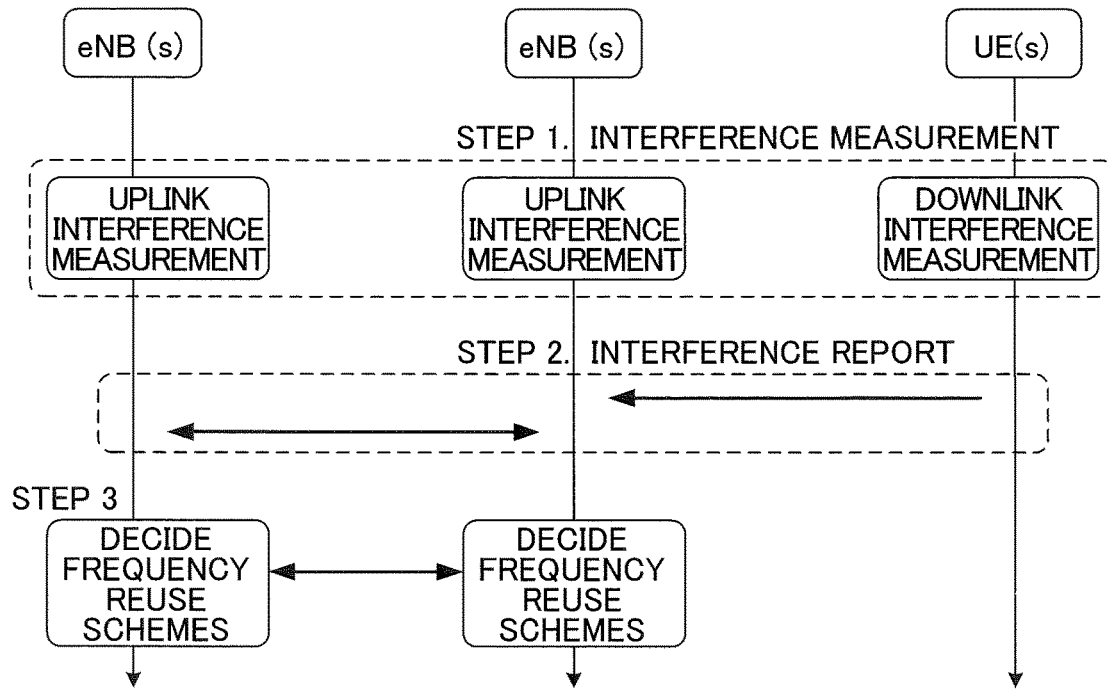

SB0 : USED FOR CELL CENTER UES   SB: SUBBAND
SB1/2/3 : USED FOR CELL EDGE UES

HYBRID TDD/FDD OPERATION

STRICT TDD OPERATION

STRICT TDD OPERATION

RADIO BASE STATION, USER TERMINAL AND RADIO COMMUNICATION METHOD

TECHNICAL FIELD

The present invention relates to a radio base station, a user terminal and a radio communication method that are applicable to cellular systems and so on.

BACKGROUND ART

In a UMTS (Universal Mobile Telecommunications System) network, attempts are made to optimize the features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rate. With this UMTS network, long-term evolution (LTE) has been under study and its specifications have been drafted, for the purposes of further increasing high-speed data rates, providing low delay, and so on (non-patent literature 1).

In a third-generation system, it is possible to achieve a transmission rate of approximately 2 Mbps at the maximum on the downlink by using a fixed band of approximately 5 MHz. Meanwhile, in an LTE system, it is possible to achieve a transmission rate of approximately 300 Mbps at the maximum on the downlink and approximately 75 Mbps on the uplink by using a variable band, which ranges from 1.4 MHz to 20 MHz. Also, in the UMTS network, a successor system of the LTE system (referred to as, for example, "LTE-advanced" or "LTE enhancement" (hereinafter referred to as "LTE-A")) has been under study and its specifications have been drafted, for the purpose of achieving further broadbandization and increased speed.

As duplexing methods in radio communication, there are frequency division duplex (FDD) to divide between the uplink (UL) and the downlink (DL) based on frequency, and time division duplex (TDD) to divide between the uplink and the downlink based on time. In TDD, the same frequency region is applied to uplink and downlink communication, and signals are transmitted and received to and from one transmitting/receiving point by dividing the uplink and the downlink based on time.

In TDD in the LTE system, a plurality of frame configurations (DL/UL configurations) with different transmission ratios between uplink subframes and downlink subframes are defined (see FIG. 1). In the LTE system, as shown in FIG. 1, seven frame configurations, namely DL/UL configurations 0 to 6, are defined, where subframes #0 and #5 are allocated to the downlink, and subframe #2 is allocated to the uplink. Also, generally speaking, in TDD, in one given frequency carrier, the same DL/UL configuration is employed between geographically-neighboring transmission points in order to prevent interference between the transmission points (or the cells).

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Generally speaking, DL traffic and UL traffic are asymmetrical. Also, the ratio between UL traffic and DL traffic is not constant, and varies over time or between locations. For example, when TDD is employed, from the perspective of allowing effective use of radio resources, the DL/UL configurations shown in FIG. 1 are preferably switched around over time or between locations, in accordance with the actual variation of traffic, rather than fixed.

In particular, in TDD in LTE-A and later systems, in order to allow effective use of radio resources, a study is in progress to change the transmission ratio of DL and UL dynamically, in the time domain, per transmitting/receiving point (dynamic TDD). In this case, when a DL subframe and a UL subframe are transmitted at the same time in the same time region and frequency region between geographically-neighboring transmitting/receiving points, there is a threat that interference may be produced between the transmitting/receiving points or between user terminals, and the performance of communication quality might deteriorate.

The present invention has been made in view of the above, and it is therefore an object of the present invention to provide a radio base station, a user terminal and a radio communication method that can reduce the impact of interference and that can furthermore improve the efficiency of the use of radio resources even when different DL/UL configurations are employed between neighboring transmitting/receiving points.

Solution to Problem

A radio base station according to the present invention is a radio base station that can communicate with user terminals via time division duplex and that can furthermore change and control DL/UL configurations, and has a subframe type determining section that classifies subframes into fixed subframes or flexible subframes, in accordance with the relationship between DL/UL configurations that are employed in the radio base station and DL/UL configurations that are employed in other radio base stations, and a frequency allocation control section that applies mutually different frequency allocation methods to the fixed subframes and the flexible subframes.

Advantageous Effects of Invention

According to the present invention, even when different DL/UL configurations are employed between neighboring transmitting/receiving points, it is still possible to reduce the impact of interference and furthermore improve the efficiency of the use of radio resources.

BRIEF DESCRIPTION OF DRAWINGS

FIG. 1 is a diagram to explain examples of DL/UL configurations in TDD;

FIG. 5 provides diagrams to show frequency allocation methods (frequency reuse schemes) that can be used in the present embodiment;

FIG. 6 is a diagram to show combinations of frequency allocation methods to apply to fixed subframes and flexible subframes;

FIG. 7 provides diagrams to show radio communication systems that can be used in embodiment 1;

FIG. 10 provides diagrams to show examples of sequence diagrams when the frequency allocation method to apply is determined based on the interference level;

DESCRIPTION OF EMBODIMENTS

Figure 2A:
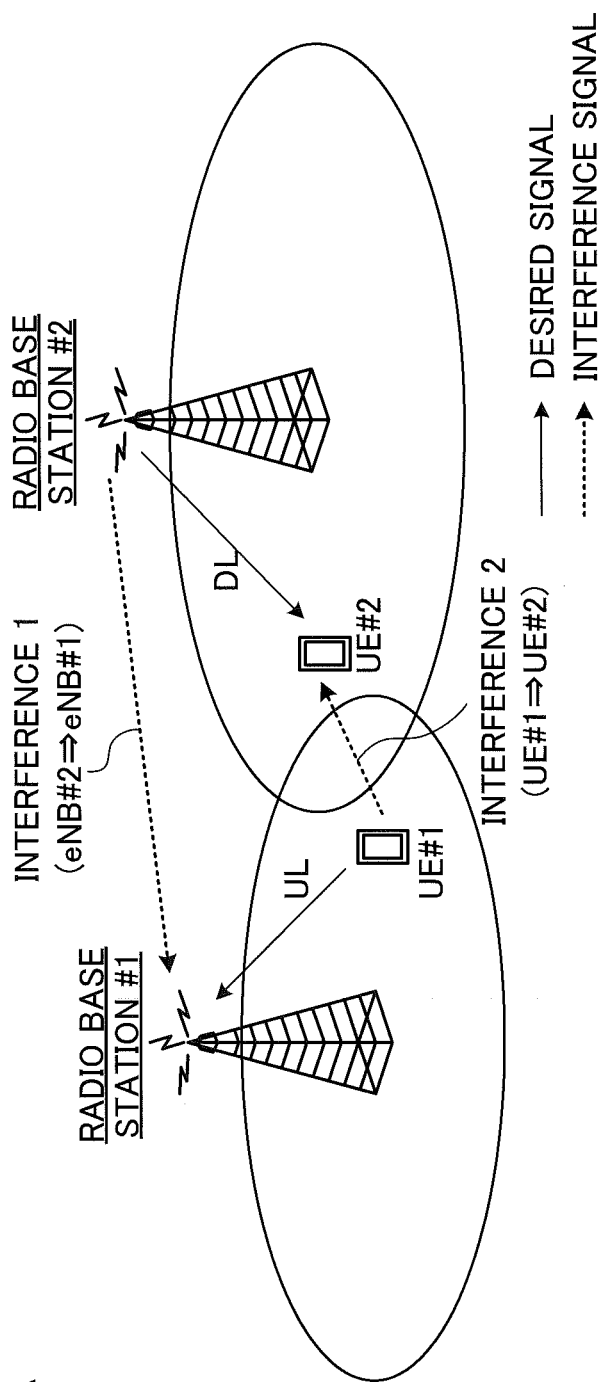
FIG. 2 provides diagrams to show an example of a radio communication system where different DL/UL configurations are employed between neighboring radio base stations.

First, an example case where the transmission ratio between DL and UL (DL/UL configuration) is changed dynamically (dynamic TDD), on a per transmitting/receiving point basis, when TDD is employed, will be described with reference to FIG. 2. Note that the radio communication system shown in FIG. 2A is formed by including a plurality of transmitting/receiving points (here, radio base stations #1 and #2), and user terminals #1 and #2 that communicate with radio base stations #1 and #2. A transmitting/receiving point may be a radio base station or a cell.

Figure 2B:
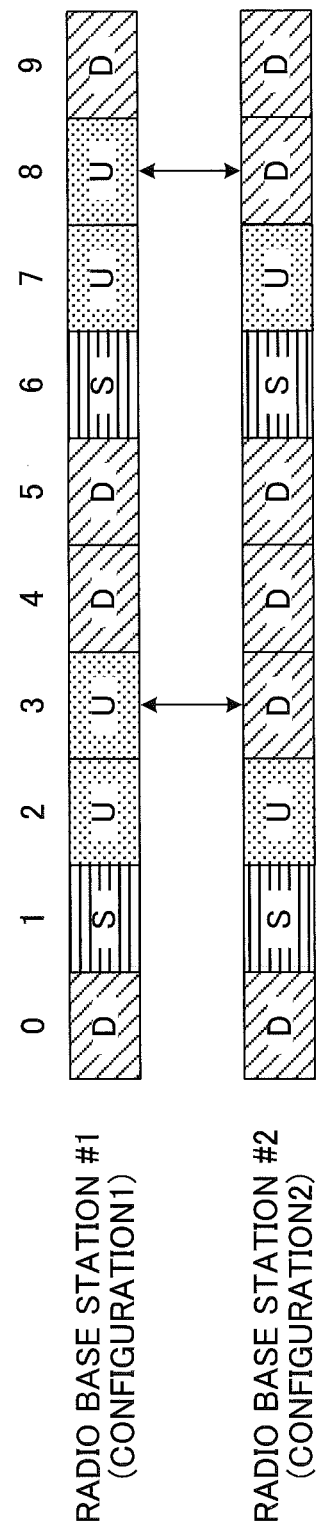

In FIG. 2A, radio communication is carried out between radio base station #1 and user terminal #1, and between radio base station #2 and user terminal #2, by means of time division duplexing (TDD). FIG. 2B illustrates a case where radio base station #1 employs DL/UL configuration 1 and radio base station #2 employs DL/UL configuration 2.

In this case, in subframes 3 and 8, radio base station #1 carries out UL transmission, while radio base station #2 carries out DL transmission. That is, in the same time regions/the same frequency regions, downlink signals are transmitted from radio base station #2 to user terminal #2, and uplink signals are transmitted from user terminal #1 to radio base station #1.

Consequently, the downlink signals that are transmitted from radio base station #2 to user terminal #2 may interfere with the uplink signals that are transmitted from user terminal #1 to radio base station #1 (interference 1 between radio base station #1 and radio base station #2). Also, the uplink signals that are transmitted from user terminal #1 to radio base station #1 may interfere with the downlink signals that are transmitted from radio base station #2 to user terminal #2 (interference 2 between user terminal #1 and user terminal #2) (see FIG. 2A).

As a result of this, there is a threat that the received quality of radio base station #1 and the received quality of user terminal #2 lower in subframes #3 and #8. Also, normally, the transmission power of downlink signals that are transmitted from the radio base stations to the user terminals is greater than the transmission power of the uplink signals that are transmitted from the user terminals to the radio base stations. Consequently, the interference (interference 1 in FIG. 2A) which the downlink signals transmitted from the radio base stations cause against the uplink signals (for example, uplink control signals) transmitted from the user terminals have a particularly large impact.

In this way, when different DL/UL configurations are employed between neighboring radio base stations and DL subframes and UL subframes overlap, the impact of interference (interference between radio base stations) which downlink signals have against an uplink control channel (PUCCH) and so on increases, and there is a threat that the quality of communication might deteriorate.

Now, various interference mitigation strategies are under study as methods of mitigating interference between neighboring cells. For example, there is a strategy to establish orthogonality along the frequency direction by using different frequency regions (which may be carriers or resource blocks) between neighboring cells. Also, a strategy is under study in which each cell applies a common frequency region to user terminals that are located in the center of the cell, and applies mutually different frequency regions to user terminals that are located on cell edges.

Such interference mitigation strategies may be used when a plurality of transmitting/receiving points employ dynamic TDD. For example, when different frequency regions are allocated between neighboring cells, in subframes in which the direction of transmission differs between neighboring cells (and in which therefore the impact of interference is large), it becomes possible to reduce the interference between the radio base stations and between user terminals.

However, in this case, even in subframes in which the direction of transmission is the same between the neighboring cells (and in which therefore the impact of interference is small), different frequency regions are used between the neighboring cells. That is, in subframes in which the interference between the radio base stations and between user terminals has a small impact, frequency regions (radio resources) that are not used are produced in each cell. As a result of this, the efficiency of the use of radio resources cannot be optimized.

So, the present inventors have focused on the direction of transmission (UL/DL) in each transmitting/receiving point in each subframe, and come up with the idea of classifying subframes based on the direction of transmission, when different DL/UL configurations are employed between different transmitting/receiving points. The present inventors have also found out that it is possible to reduce interference between radio base stations and between user terminals, and, furthermore, improve the efficiency of the use of radio resources, by applying suitable frequency allocation methods to the classified subframes, separately (see following embodiment 1).

To be more specific, depending on the DL/UL configurations that are employed in different transmitting/receiving points, respectively, every subframe is defined as a fixed subframe or a flexible subframe (or a dynamic subframe). Then, different frequency allocation methods (frequency allocation that is suitable for each) are applied to the fixed subframes and the flexible subframes. The frequency allocation methods may be frequency reuse schemes or may be interference mitigation strategies.

With the present embodiment, a fixed subframe can be defined as an equivalent to a subframe in which the direction of transmission in the DL/UL configuration is the same between different transmitting/receiving points, and a flexible subframe can be defined as an equivalent to a subframe in which the direction of transmission in the DL/UL configuration is different between different transmitting/receiving points. For example, as shown in FIG. 2, when radio base station #1 employs DL/UL configuration 1 and radio base station #2 employs DL/UL configuration 2, it is possible to classify subframes 0, 1, 2, 4, 5, 6, 7, and 9 as fixed subframes and classify subframes 3 and 8 as flexible subframes. Note that, when the type of each subframe is determined, a special subframe can be seen as a DL subframe.

Now, apart from the above-described interference mitigation strategies, a study is also in progress to use the mechanism of half-duplex FDD for a strategy to mitigate interference in dynamic TDD. The half-duplex FDD scheme is a radio communication scheme, in which, similar to the FDD scheme, different frequency regions (which may be carriers or resource blocks) are allocated between the uplink and the downlink, while, for a given user terminal, uplink transmission and downlink transmission are not carried out simultaneously. That is, with respect to a given user terminal, uplink transmission and downlink transmission are separated based on time. That uplink transmission and downlink transmission are separated based on time is common with the operation of the TDD scheme.

Figure 3:
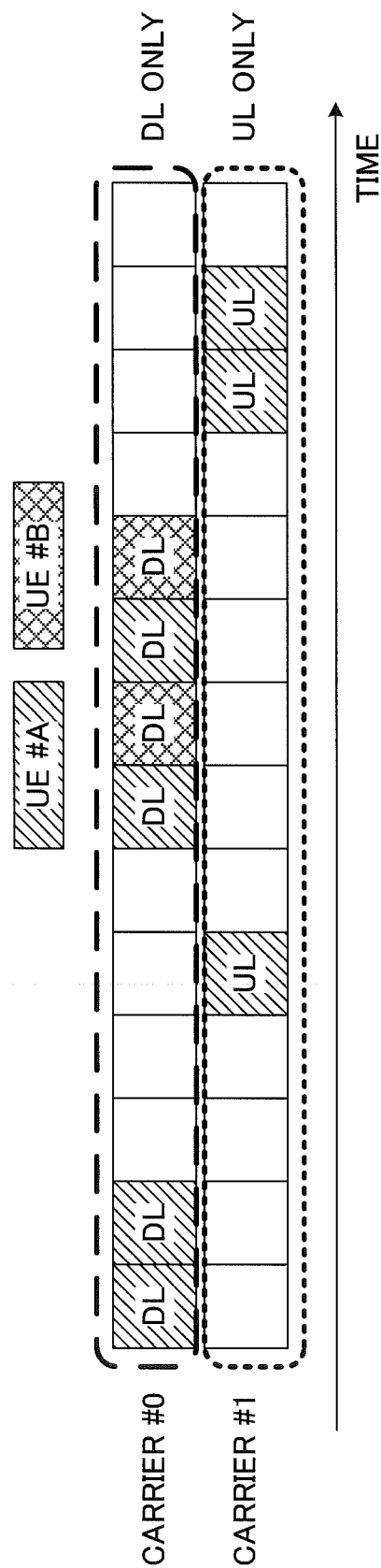
FIG. 3 is a diagram to show an example of radio resource allocation when the mechanism of half-duplex FDD is used.

When the mechanism of half-duplex FDD is used, carriers are allocated so that, as shown in FIG. 3, the UL carrier to use in uplink transmission and the DL carrier to use in downlink transmission are orthogonal to each other along the frequency direction. Then, in one transmission time interval (for example, one subframe), signals are transmitted and received to and from one user terminal, by using the transmission direction of one of the UL carrier and the DL carrier.

In FIG. 3, each radio base station communicates by using the DL carrier (carrier #0 in FIG. 3) and the UL carrier (carrier #1 in FIG. 3). Also, UL transmission and DL transmission for one user terminal are carried out using different carriers and in different subframes. In this way, by using the mechanism of half-duplex FDD, even when different DL/UL configurations are employed between neighboring radio base stations, it is still possible to reduce the interference that is produced between the radio base stations and between user terminals.

However, in normal systems, it may occur that the amount of DL traffic and the amount of UL traffic are asymmetrical (for example, the amount of DL traffic is considerably heavy compared to the amount of UL traffic). In this case, if the UL carrier and the DL carrier are configured separately as shown in FIG. 3, there is a threat that the efficiency of the use of radio resources may decrease.

So, the present inventors have come up with the idea of classifying subframes into fixed subframes or flexible subframes as noted earlier, and using a predetermined frequency region (carrier or resource block) in the flexible subframes as the UL carrier and another frequency region as the DL carrier (see embodiment 2, which will be described later).

For example, assume a case where the flexible subframes tolerate simultaneous transmission of UL and DL. In this case, in the flexible subframes, radio base stations and user terminals use a predetermined frequency region (for example, a first carrier) as the DL carrier, and use another frequency region (for example, a second carrier) as the UL carrier (FDD). Meanwhile, in the fixed subframes, the radio base stations and the user terminals carry out UL transmission or DL transmission by using the first carrier and the second carrier (TDD). That is, in the fixed subframes, TDD is employed in a wide frequency region, and, in the flexible subframes, the mechanism of FDD is used by using a plurality of frequency regions (hybrid TDD/FDD operation).

Furthermore, the present inventors have come up with the idea of employing a configuration to establish orthogonality with respect to other transmitting/receiving points in the frequency domain by classifying subframes into fixed subframes or flexible subframes as described above, and by making a predetermined frequency region in the flexible subframes subject to non-transmission (empty subframe).

For example, in the flexible subframes, a radio base station and its serving user terminals carry out transmission/reception (DL transmission or UL transmission) only in frequency regions (for example, in a first carrier) that are orthogonal to the frequencies used in other radio base stations and their serving user terminals. The other radio base stations and user terminals carry out transmission/reception (DL transmission or UL transmission) only in other frequency regions (for example, in a second carrier). Meanwhile, in the fixed subframes, each radio base station and the user terminals carry out UL transmission or DL transmission by using the first carrier and the second carrier.

Now, the present embodiment will be described below in detail with reference to the accompanying drawings. Note that, although examples with two or three transmitting/receiving points will be described as examples in the following description, the applicable number of transmitting/receiving points is by no means limited to these. Furthermore, although, with the present embodiment, configurations that are defined in the LTE system (see FIG. 1) will be shown as DL/UL configurations to employ in each transmitting/receiving point, the applicable DL/UL configurations are by no means limited to these.

(Embodiment 1)

Cases will be described with embodiment 1 where, when dynamic TDD is employed, different frequency allocation methods are applied to the fixed subframes and flexible subframes (or dynamic subframes), which are classified depending on the DL/UL configuration employed in each transmitting/receiving point.

Figure 4:
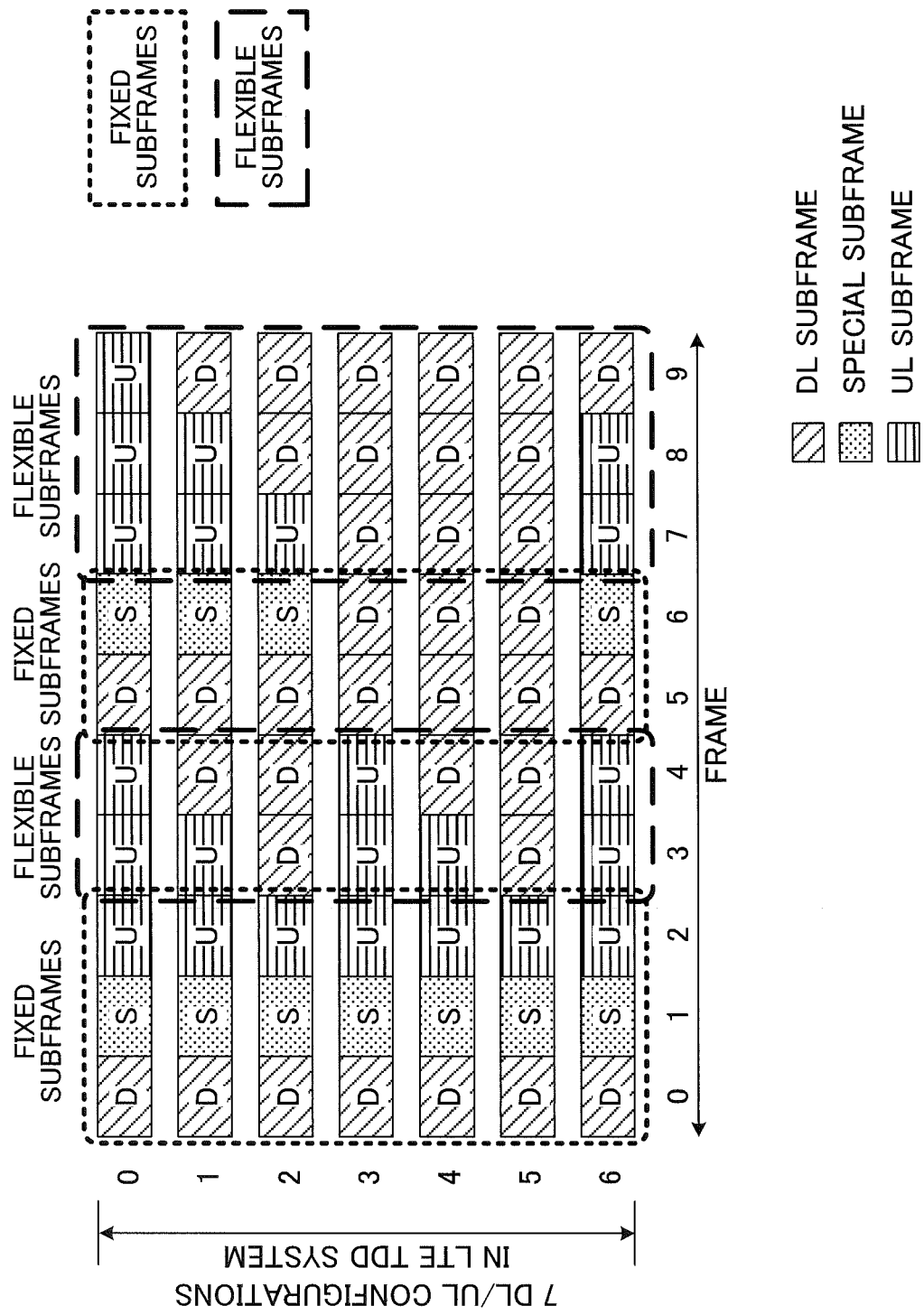
FIG. 4 is a diagram to explain a method of classifying between fixed subframes and flexible subframes.

First, the method of classifying subframes will be described with reference to FIG. 4. FIG. 4 shows the direction of transmission in each subframe in DL/UL configurations 0 to 6, in one subframe. The fixed subframes and flexible subframes can be determined based on the direction of transmission in each subframe. For example, when considering all of DL/UL configurations 0 to 6, it is possible to define subframes 0, 1, 2, 5, and 6 as fixed subframes and subframes 3, 4, 7, 8, and 9 as flexible subframes. Note that, here, each subframe's type is determined by seeing the special subframes as DL subframes.

In this way, a fixed subframe is equivalent to a subframe in which the direction of transmission is the same between neighboring transmitting/receiving points (and in which there is little interference between radio base stations and between user terminals). On the other hand, a flexible subframe is equivalent to a subframe in which the direction of transmission differs between neighboring transmitting/receiving points (and in which there is significant interference between radio base stations and between user terminals).

Every transmitting/receiving point classifies subframes into fixed subframes or flexible subframes based on the relationship between the DL/UL configurations that are employed in the subject apparatus and the DL/UL configurations that are employed in other transmitting/receiving points. Note that, with respect to those subframes that are defined as flexible subframes, each radio base station is able to configure the direction of transmission, whether or not there is transmission/reception, as appropriate and flexibly, depending on the communicating environment and so on.

After the subframes have been classified into fixed subframes or flexible subframes, mutually different frequency allocation methods are applied to the classified subframes. When this takes place, to the flexible subframes in which the interference between radio base stations and between user terminals has a large impact, a method having a greater interference mitigation effect than the frequency allocation method to apply to the fixed subframes is applied. Note that the frequency allocation methods may be frequency reuse schemes or may be interference mitigation strategies.

Now, examples of frequency allocation methods that can be used in the present embodiment will be described with reference to FIG. 5.

(1) Orthogonal Frequency Reuse

FIG. 5A illustrates a method in which neighboring cells use different frequency regions. A case is illustrated here where three cells #1, #2 and #3 use frequencies f1, f2 and f3, which are orthogonal to each other, respectively. Note that the frequency reuse factor (FRF) assumes an integer greater than 1.

(2) Fractional Frequency Reuse (FFR)

In FIG. 5B, a frequency region that is common between the cells (part of the system band) is applied to user terminals that are located in the center in each cell. Then, with this method, every cell applies a different frequency region to user terminals that are located on the edge in each cell (cell edge).

For example, the frequency region that is left after the common frequency (f0) is removed from the system band is divided into a plurality of subbands (f1, f2 and f3), and each cell uses one subband for cell-edge user terminals while carrying out no transmission (that is, mute) in the other subbands. Here, common frequency f0 is applied to user terminals that are located in the center in cells #1, #2 and #3, and subbands f1, f2 and f3 are applied to cell-edge user terminals in cells #1, #2 and #3, respectively. Note that the example shown in FIG. 5B is by no means limiting, and any frequency allocation methods to use the mechanism of FFR are applicable.

(3) Soft Frequency Reuse (SFR)

In FIG. 5C, a frequency region that is common between the cells (system band (combination of multiple subbands)) is applied to user terminals that are located in the center in each cell. Then, with this method, every cell applies a different frequency region to user terminals that are located on cell edges in each cell.

For example, the system band (f) is divided into a plurality of subbands (f1, f2 and f3), and the neighboring cells each configure the transmission power high in a specific subband, which varies mutually, and configure the transmission power low in the other subbands. Here, the transmission power of subband f1 is configured higher than in the other subbands f2 and f3 in cell #1, the transmission power of subband f2 is configured higher than in the other subbands f1 and f3 in cell #2, and the transmission power of subband f3 is configured higher than in the other subbands f1 and f2 in cell #3.

(4) Co-Channel Deployment

FIG. 5D shows a method in which all cells use the same frequency region. A case is illustrated here where cells #1, #2 and #3 use the same frequency region (f). Note that the frequency reuse factor (FRF) is 1.

By using the above interference mitigation strategies of FIGS. 5A to 5C, even when subframes are produced in which different transmission directions are configured between neighboring cells while dynamic TDD is employed, it is still possible to reduce the interference between radio base stations in these subframes. In particular, in the orthogonal frequency reuse shown in FIG. 5A, different frequency regions are used between neighboring cells, so that the interference mitigation effect improves. Meanwhile, when orthogonal frequency reuse is employed, the frequency region that each cell can use becomes smaller even in subframes where the same transmission direction is configured between neighboring cells, so that spectral efficiency decreases.

So, with the present embodiment, a frequency allocation method with high spectral efficiency is preferentially applied to the fixed subframes in which the impact of interference is small, and a frequency allocation method with a high interference mitigation effect is preferentially applied to the flexible subframes in which the impact of interference is large. For example, when the frequency allocation methods (frequency reuse schemes) shown in FIG. 5 are used, the impact of interference between radio base stations is high in the order of: (4) co-channel deployment>(3) soft frequency reuse>(2) fractional frequency reuse>(1) orthogonal frequency reuse. Meanwhile, the effect regarding spectral efficiency may assume the opposite order to this. Consequently, control is executed so that the index number of the frequency allocation method to apply to the fixed subframes is equal to or greater than the index number of the frequency allocation method to apply to the flexible subframes (see FIG. 6).

To be more specific, as shown in FIG. 6, (4) co-channel deployment is applied to the fixed subframes, and (1) orthogonal frequency reuse, (2) fractional frequency reuse or (3) soft frequency reuse is applied to the flexible subframes. Also, (3) soft frequency reuse is applied to the fixed subframes, and (1) orthogonal frequency reuse, (2) fractional frequency reuse or (3) soft frequency reuse is applied to the flexible subframes. Also, (2) fractional frequency reuse is applied to the fixed subframes, and (1) orthogonal frequency reuse or (2) fractional frequency reuse is applied to the flexible subframes.

In this way, based on the relationship as to the direction of transmission in each subframe in the DL/UL configurations that are used in other radio base stations, every radio base station configures the fixed subframes and the flexible subframes, and applies different frequency allocation methods to the fixed subframes and the flexible subframes. Now, example operations according to the present embodiment will be described below with reference to the accompanying drawings.

FIG. 7 shows examples of radio communication systems where the present embodiment is applied. FIG. 7A shows a case where control is executed by providing a central control station ("with central node"), and FIG. 7B shows a case where control is executed by connecting between radio base stations (direct connection) without providing a central control station ("without central node"). Note that, in FIG. 7, the user terminals that are located in the center in the cells (cell-center UEs) and the user terminals that are located on cell edges (cell-edge UEs) can be differentiated based on the relationship between each user terminal's signal intensity and a predetermined threshold. For example, user terminals that are beyond a threshold Th may be defined to be located in the cell center, and user terminals that are equal to or lower than the threshold Th may be defined to be located on cell edges.

Figure 8A:
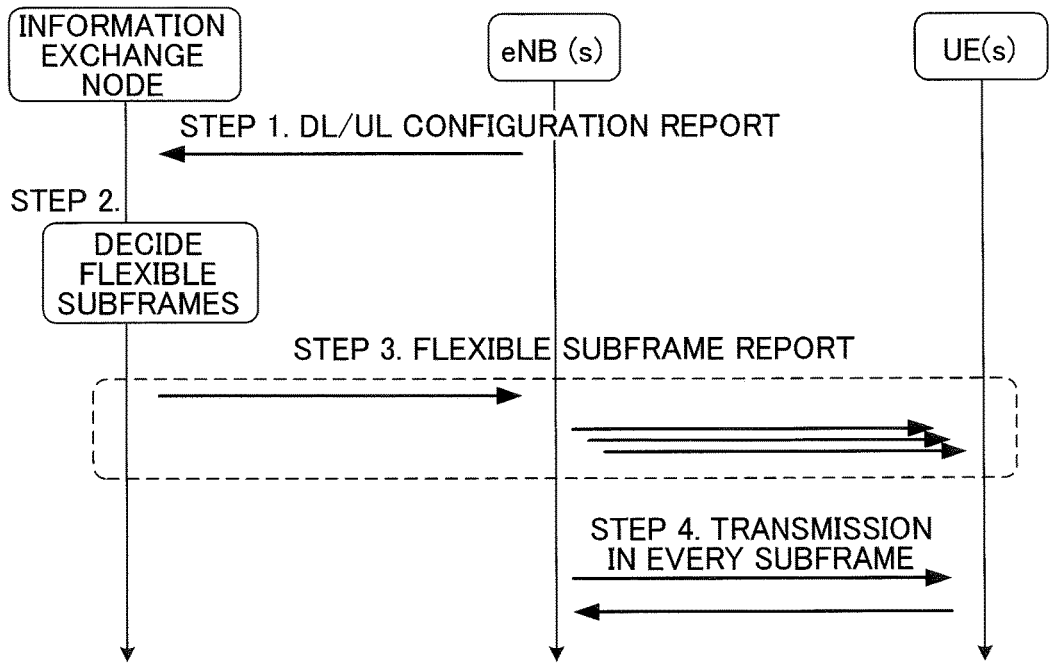
FIG. 8 provides diagrams to show examples of sequence diagrams when the types of subframes are determined based on UL/DL configurations.

FIG. 8A shows an example of a sequence diagram when control is executed by providing a central control station (see FIG. 7A). Each radio base station reports its DL/UL configuration to the central control station (information exchange node (central processing node or master eNB)) (step 1). The central control station determines the fixed subframes and the flexible subframes based on the DL/UL configurations reported from each radio base station (step 2).

The central control station reports information related to the flexible subframes (and the fixed subframes) to each radio base station (step 3). Also, each radio base station reports the information reported in relationship to the flexible subframes to the user terminals (step 3). The report to the user terminals may be sent by using RRC signaling, broadcast information, downlink control information and so on. Also, it is equally possible to report the information related to the flexible subframes to the user terminals as bitmap-format information. Alternatively, it is also possible to report a plurality of candidate patterns to the user terminals as information about the flexible subframes by using RRC and so on, and report selected candidate patterns by using downlink control signals.

Note that, if a user terminal is connected with both a radio base station (for example, a small base station) and the central control station (for example, a macro base station) (dual connection), the information related to the flexible subframes may be reported from the central control station to the user terminal. After that, each radio base station applies suitable frequency allocation methods to the fixed subframes and the flexible subframes, separately, and communicates with the user terminals (step 4).

Figure 8B:
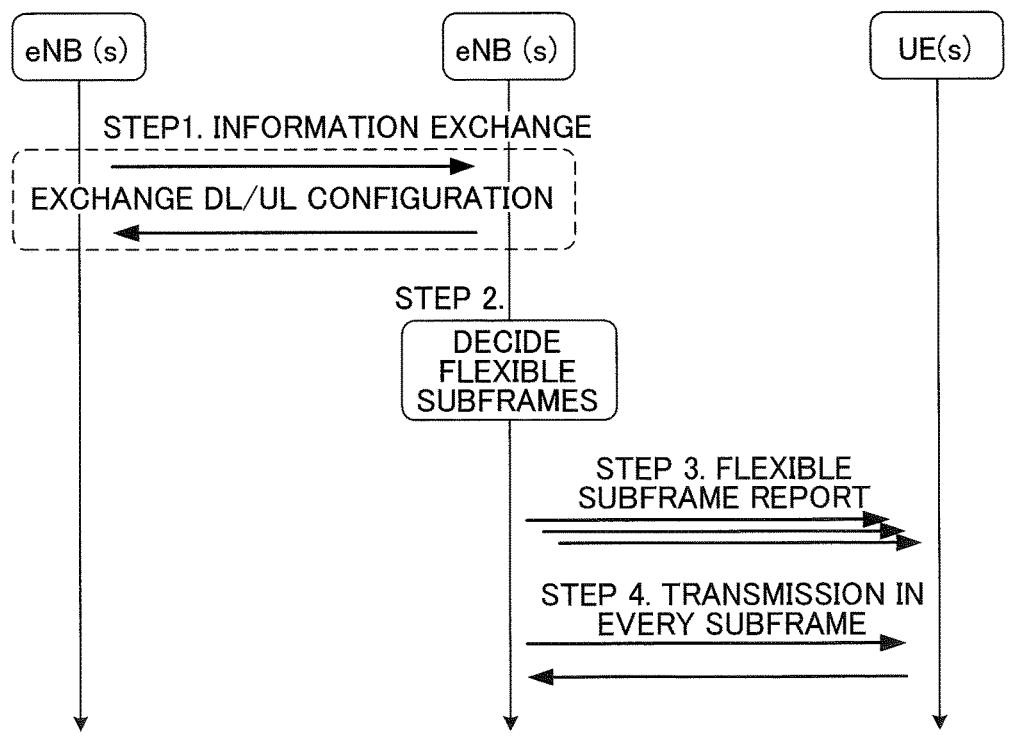

FIG. 8B shows an example of a sequence diagram when control is executed by connecting between radio base stations, without providing a central control station (see FIG. 7B). Each radio base station exchanges information related to DL/UL configurations via direct connection (step 1). Each radio base station determines the fixed subframes and the flexible subframes based on the DL/UL configurations reported from the other radio base station (step 2). Each radio base station reports information related to the flexible subframes (and the fixed subframes) to the user terminals (step 3). Note that the method of reporting to the user terminals may be the same as that in above FIG. 8A. After that, each radio base station applies suitable frequency allocation methods to the fixed subframes and the flexible subframes, separately, and communicates with the user terminals (step 4).

Figure 9:
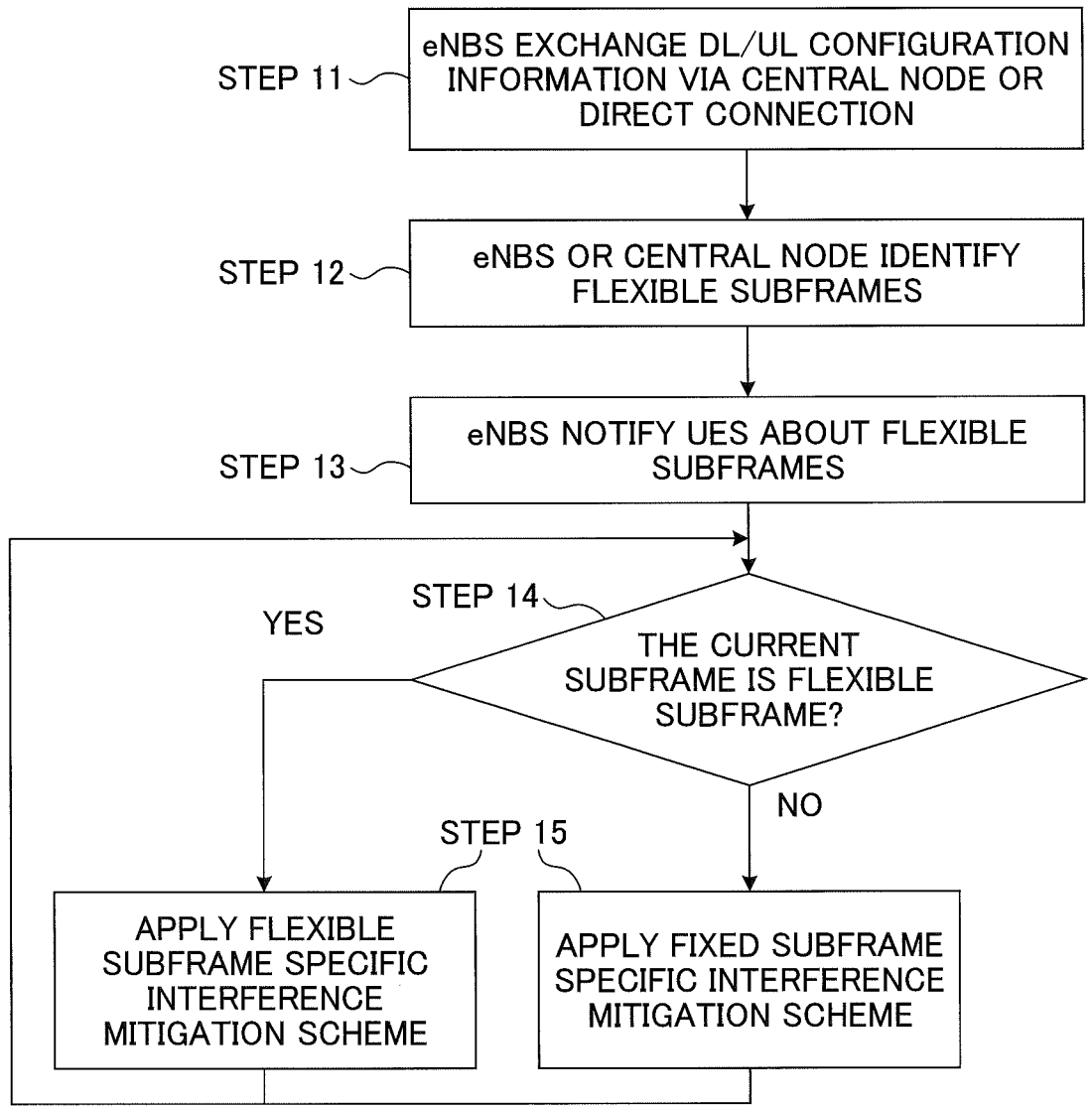
FIG. 9 is a diagram to show an example of a flowchart when the types of subframes are determined based on UL/DL configurations.

FIG. 9 shows an example of a flowchart when different frequency allocation methods are applied to the fixed subframes and the flexible subframes. First, each radio base station exchanges information related to the DL/UL configurations that are employed in each radio base station via the central control station or via the direct connection between radio base stations (step 11). Following this, each radio base station or the central station determines the flexible subframes based on the direction of transmission in each subframe in the DL/UL configurations used in each radio base station (step 12). Following this, each radio base station sends a report regarding the flexible subframes, to the user terminals (step 13). Following this, each radio base station identifies between the fixed subframes and the flexible subframes (step 14), and changes and employs the frequency allocation methods, depending on the types of subframes (step 15).

Note that although cases have been described above with FIG. 8 and FIG. 9 where the types of subframes are classified based on the direction of transmission in each subframe in the DL/UL configuration employed in each radio base station and different frequency allocation methods are employed, the present embodiment is by no means limited to these. For example, it is equally possible to measure the interference level that is received from other radio base stations in each subframe, and determine the frequency allocation method (frequency reuse scheme) to apply to each subframe based on this interference level. The operation to assume when the frequency allocation method is controlled based on the interference level will be described below.

FIG. 10A is an example of a sequence diagram when control is executed by providing a central control station ("with central node"). Each radio base station measures the interference level from other radio base stations in each subframe (step 1). For example, a radio base station that carries out UL transmission measures, in a subframe, the interference level that is received from other radio base stations carrying out DL transmission. Similarly, each user terminal may measure the interference level from other user terminals (step 1). For example, a user terminal that is engaged in DL transmission measures, in a subframe, the interference level that is received from other user terminals engaged in UL transmission.

Each radio base station (and user terminal) reports the measured interference level to the central control station (step 2). The user terminals send the report to the central control station via the radio base stations. Note that, if a user terminal is connected with both a radio base station and the central control station (dual connection), the report may be sent directly to the central control station. The central control station determines the frequency allocation method (frequency reuse scheme) to apply to each subframe based on the interference levels that are received from the radio base stations (and user terminals) (step 3). Then, the determined frequency allocation methods are reported to each radio base station (step 4).

FIG. 10B is an example of a sequence diagram when control is executed by connecting between radio base stations (direct connection) ("without central node"). Step 1 can be carried out in the same way as in above FIG. 10A. Each radio base station acquires information regarding the interference level, from other radio base stations (and from the serving user terminals) (step 2). Then, each radio base station determines the frequency allocation method (frequency reuse scheme) to apply to each subframe based on the information that is acquired in relationship to the interference level (step 3).

Figure 11:
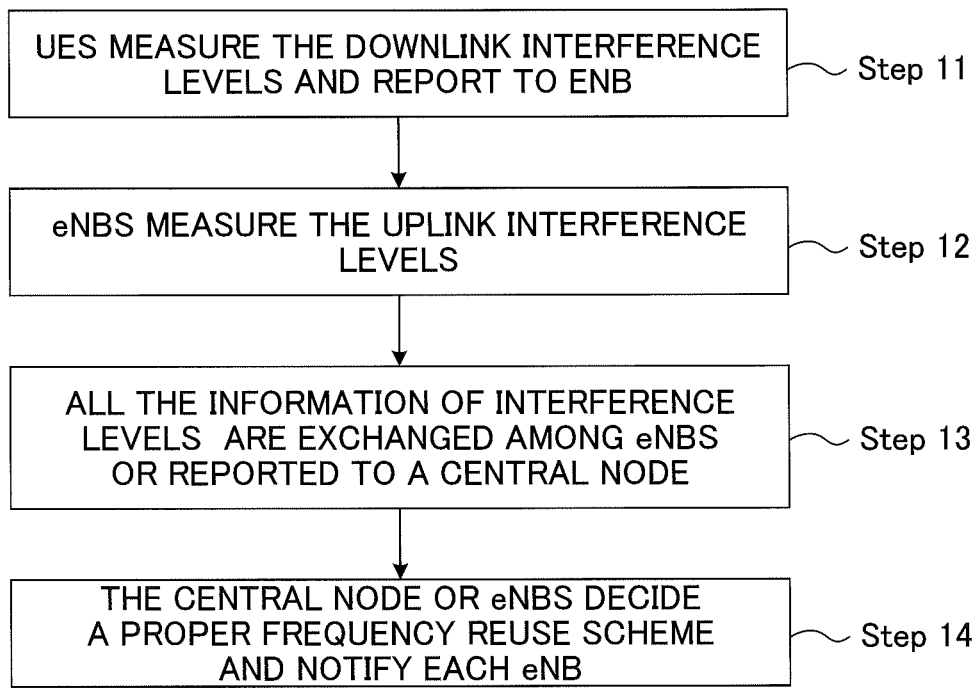
FIG. 11 is a diagram to show an example of a flowchart when the frequency allocation method to apply is determined based on the interference level.

FIG. 11 shows an example of a flowchart when the frequency allocation method is controlled based on the interference level. First, each user terminal measures the interference level on the downlink and reports this to the connecting radio base station (step 11). Also, each radio base station measures the interference level from other radio base stations on the uplink (step 12). Following this, each radio base station exchanges information that is acquired in relationship to the interference level, via the central control station or via direct connection between the radio base stations (step 13). Following this, each radio base station or the central control station determines the frequency allocation method (frequency reuse scheme) to apply to each subframe based on the interference levels acquired (step 14).

In this way, with the present embodiment, instead of classifying subframes based on the DL/UL configuration that is employed in each transmitting/receiving point, it is equally possible to classify subframes based on the interference level as well. In this case, a configuration may be used in which the frequency allocation method to apply to each subframe is determined by assuming that subframes with high interference levels are flexible subframes and that subframes with low interference levels are fixed subframes.

Now, specific examples of each frequency allocation method to apply to the fixed subframes and the flexible subframes separately will be described below with reference to the accompanying drawings. Note that although examples with three cells (cell #1, cell #2 and cell #3) will be described in the following explanation, these are by no means limiting.

<First Example>

A case will be described with a first example where (4) co-channel deployment is applied to the fixed subframes and (1) orthogonal frequency reuse is applied to the flexible subframes.

Figure 12A:
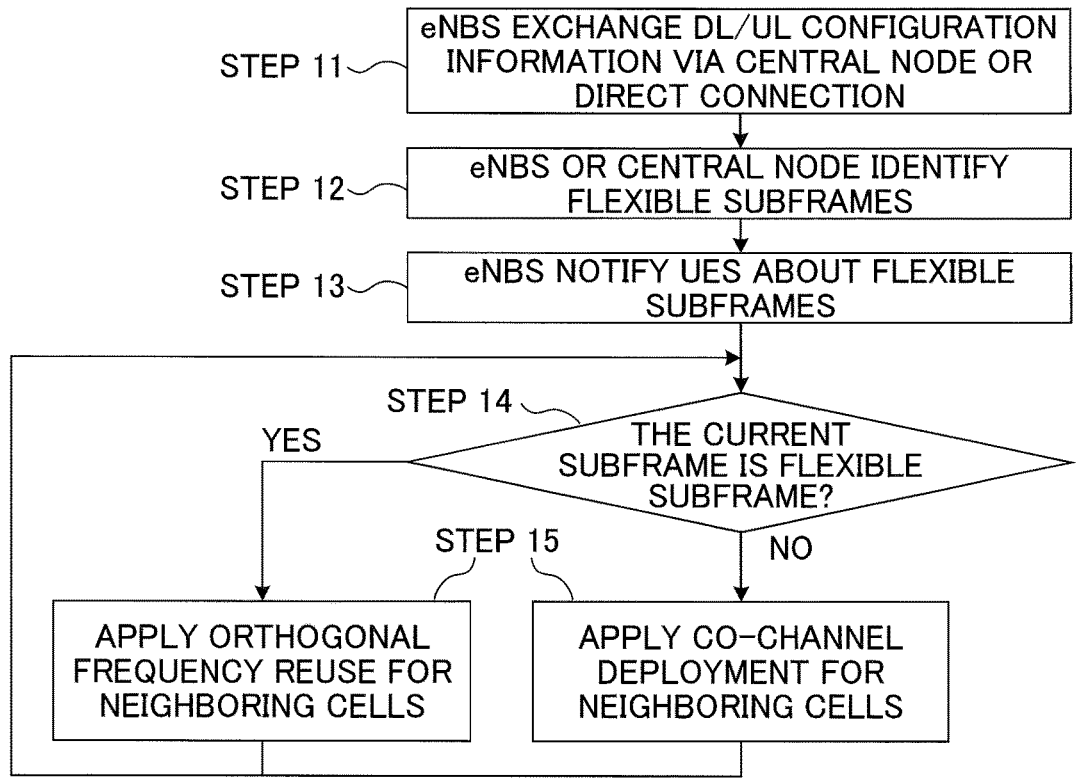
FIG. 12 provides diagrams to show combinations of frequency allocation methods to apply to fixed subframes and flexible subframes (first example)

FIG. 12A shows an example of a flowchart according to the first example. First, each radio base station exchanges information related to the DL/UL configurations that are employed in each radio base station, via a central control station or via direct connection between the radio base stations (step 11). Following this, each radio base station or the central control station determines the flexible subframes based on the direction of transmission in each subframe in the DL/UL configurations that are used in each radio base station (step 12). Note that, when the flexible subframes are determined in the central control station, the radio base stations receive information about the flexible subframes from the central control station.

Following this, each radio base station sends a report regarding the flexible subframes to the user terminals (step 13). Following this, each radio base station identifies the types of the subframes to use in communication (fixed subframes or flexible subframes) (step 14), and employs predetermined frequency allocation methods depending on the types of the subframes (step 15). Here, each radio base station applies co-channel deployment to the fixed subframes, and applies orthogonal frequency reuse to the flexible subframes.

Figure 12B:
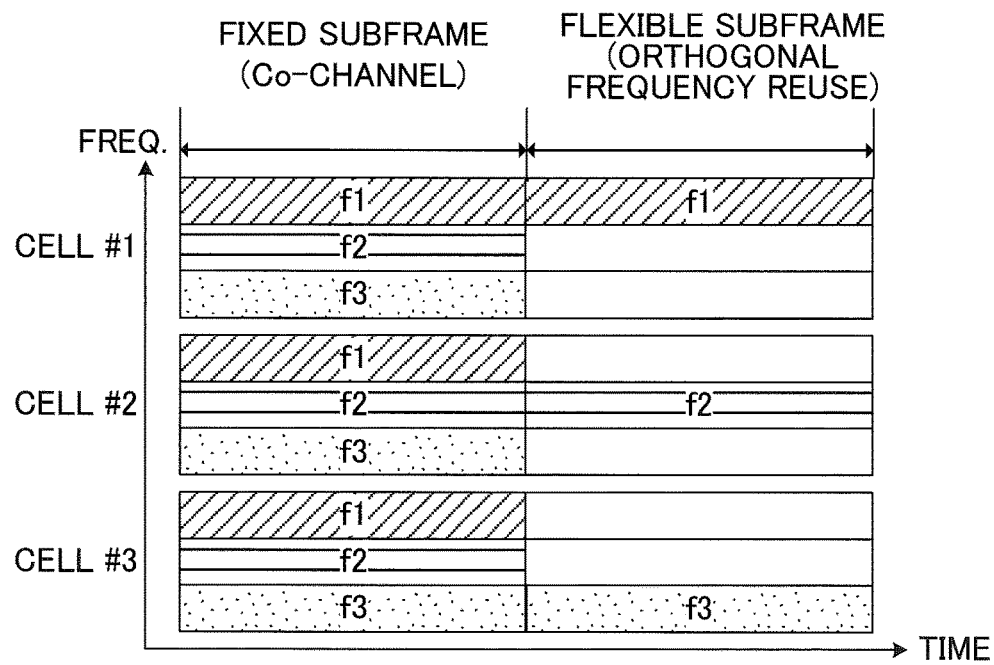

To be more specific, as shown in FIG. 12B, in the fixed subframes, frequency regions are allocated so that all cells (cell #1 to cell #3) communicate with user terminals by using the same frequency region (f1+f2+f3) (co-channel deployment). Meanwhile, in the flexible subframes, frequency regions are allocated so that the cells (cell #1 to cell #3) communicate with the user terminals by using mutually different frequency regions (f1, f2 and f3) (orthogonal frequency reuse).

In this way co-channel deployment, which can achieve improved spectral efficiency, is applied to the fixed subframes where the direction of transmission in the DL/UL configuration is the same (and where the impact of interference is small) between neighboring cells. Then, orthogonal frequency reuse, which can effectively reduce the interference between cells, is applied to the flexible subframes where the direction of transmission differs (and where the impact of interference is large). By this means, even when dynamic TDD is applied, it is still possible to effectively reduce the interference between radio base stations and between user terminals, and, furthermore, improve spectral efficiency.

<Second Example>

A case will be described with a second example where (4) co-channel deployment is applied to the fixed subframes and (1) fractional frequency reuse is applied to the flexible subframes. Note that the descriptions in parts that overlap the first example will be omitted.

Figure 13A:
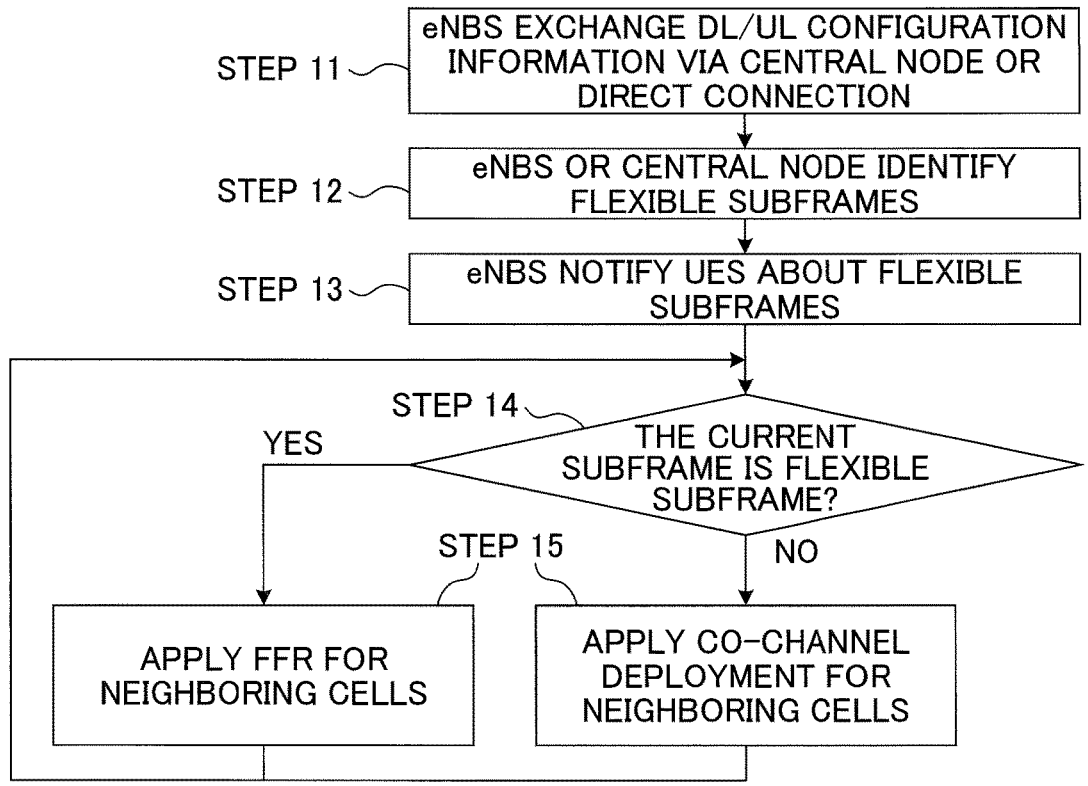
FIG. 13 provides diagrams to show combinations of frequency allocation methods to apply to fixed subframes and flexible subframes (second example)

FIG. 13A shows an example of a flowchart according to the second example. Step 11 to step 14 can be carried out in the same way as in above FIG. 12A. In step 15, each radio base station applies co-channel deployment to the fixed subframes and applies fractional frequency reuse to the flexible subframes.

Figure 13B:
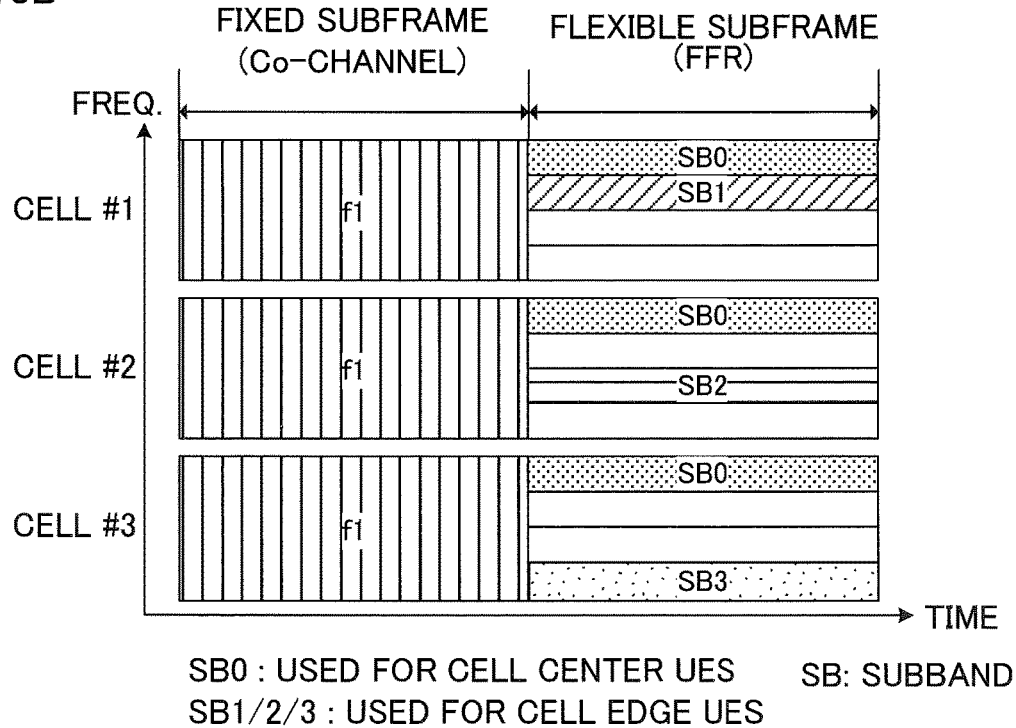

To be more specific, as shown in FIG. 13B, in the fixed subframes, frequency regions are allocated so that all cells (cell #1 to cell #3) communicate with the user terminals by using the same frequency region (f1) (co-channel deployment). Meanwhile, in the flexible subframes, each cell (cell

1 to cell #3) allocates a frequency region (subband SB0) that is common between the cells to user terminals that are located in the center of the cell. Then, mutually different frequency regions (subbands SB1, SB2 and SB3) are allocated to user terminals that are located on cell edges of each cell. Note that subbands SB1, SB2 and SB3 may be frequency regions dividing the frequency region that is left after SB0 is removed from the system band (f1).

In this way, by applying co-channel deployment, which can achieve improved spectral efficiency, to the fixed subframes, and applying fractional frequency reuse, which can effectively reduce interference, to the flexible subframes, between neighboring cells, it is possible to effectively reduce interference, and, furthermore, improve spectral efficiency.

<Third Example>

A case will be described with a third example where (4) co-channel deployment is applied to the fixed subframes and (3) soft frequency reuse is applied to the flexible subframes. Note that the descriptions in parts that overlap the first example will be omitted.

Figure 14A:
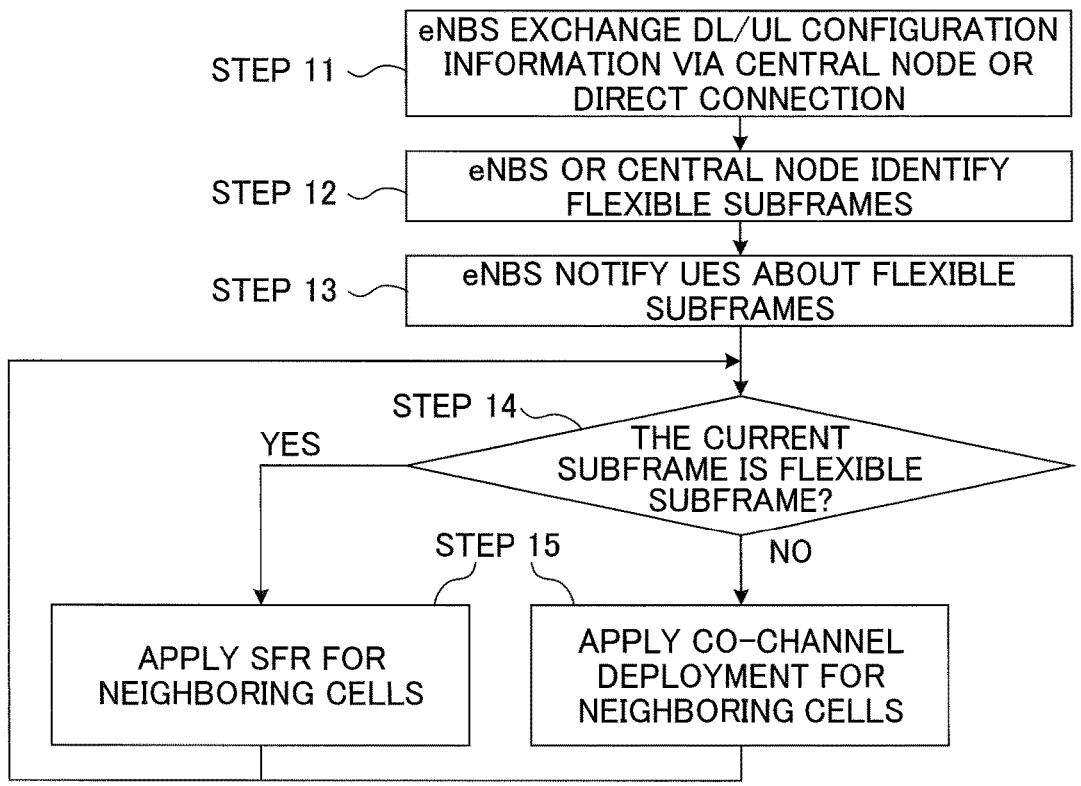
FIG. 14 provides diagrams to show combinations of frequency allocation methods to apply to fixed subframes and flexible subframes (third example)

FIG. 14A shows an example of a flowchart according to the third example. Step 11 to step 14 can be carried out in the same way as in above FIG. 12A. In step 15, each radio base station applies co-channel deployment to the fixed subframes, and applies soft frequency reuse to the flexible subframes.

Figure 14B:
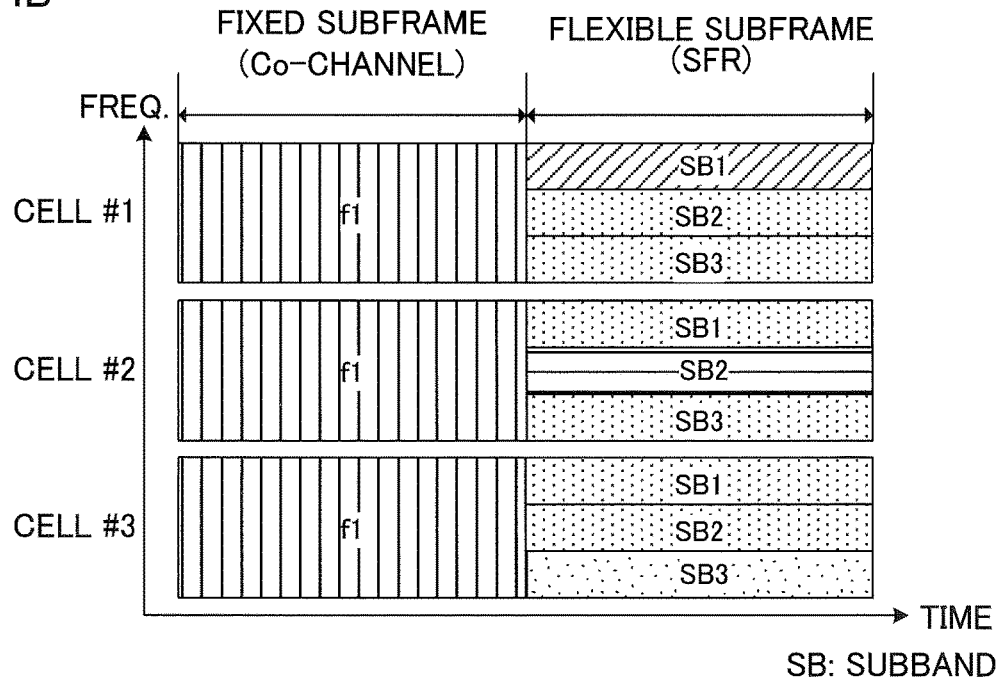

To be more specific, as shown in FIG. 14B, in the fixed subframes, frequency regions are allocated so that all cells (cell #1 to cell #3) communicate with the user terminals by using the same frequency region (f1) (co-channel deployment). Meanwhile, in the flexible subframes, the system band (f1) is divided into a plurality of subbands SB1, SB2 and SB3, each cell (cell #1 to cell #3) configures the transmission power high in one subband, which varies mutually, and configures the transmission power low in the other subbands. Here, a case is shown where cell #1 configures the transmission power of SB1 higher than the transmission power of SB2 and SB3, cell #2 configures the transmission power of SB2 higher than the transmission power of SB1 and SB3, and cell #3 configures the transmission power of SB3 higher than the transmission power of SB1 and SB2.

In this way, by applying co-channel deployment, which can achieve improved spectral efficiency, to the fixed subframes, and applying fractional frequency reuse, which can effectively reduce interference, to the flexible subframes, between neighboring cells, it is possible to effectively reduce interference, and, furthermore, improve spectral efficiency. In particular, according to the third example, it is possible to communicate with user terminals that are located in the center in each cell, by using a wide frequency region, even in the flexible subframes, so that it is possible to effectively improve spectral efficiency.

<Fourth Example>

A case will be described with a fourth example where (3) soft frequency reuse is applied to the fixed subframes and (1) orthogonal frequency reuse is applied to the flexible subframes. Note that the descriptions in parts that overlap the first example will be omitted.

Figure 15A:
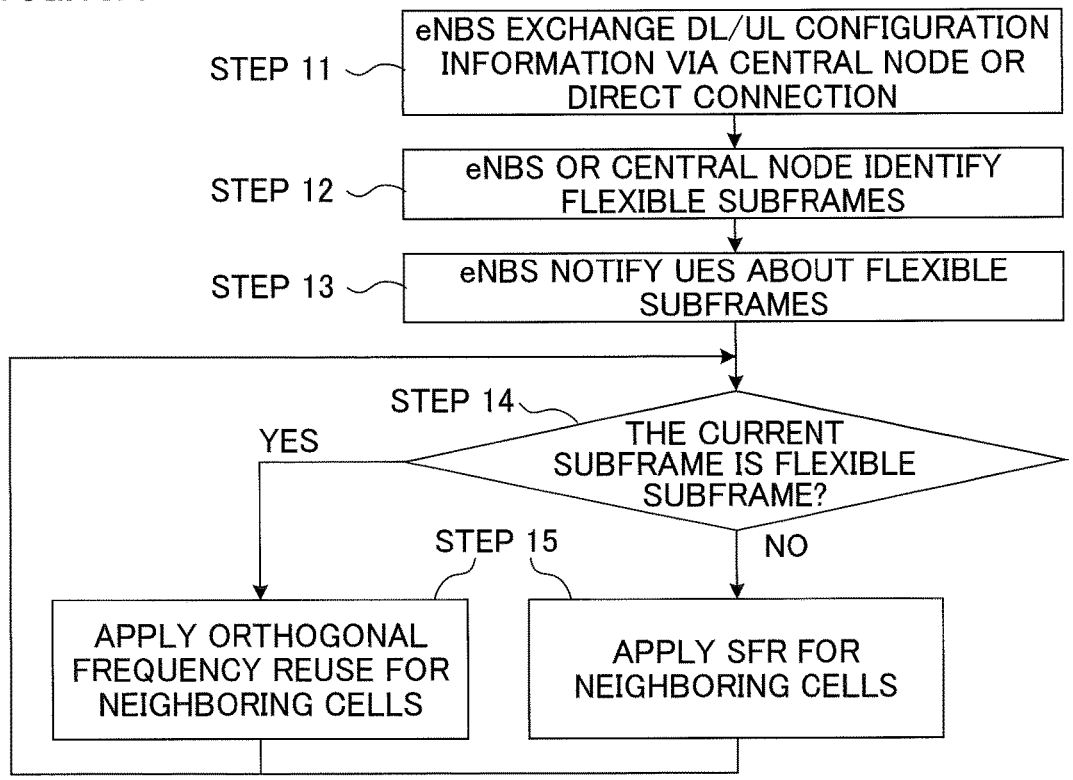
FIG. 15 provides diagrams to show combinations of frequency allocation methods to apply to fixed subframes and flexible subframes (fourth example)

FIG. 15A shows an example of a flowchart according to the fourth example. Step 11 to step 14 can be carried out in the same way as in above FIG. 12A. In step 15, the neighboring cells apply soft frequency reuse to the fixed subframes and apply orthogonal frequency reuse to the flexible subframes.

Figure 15B:
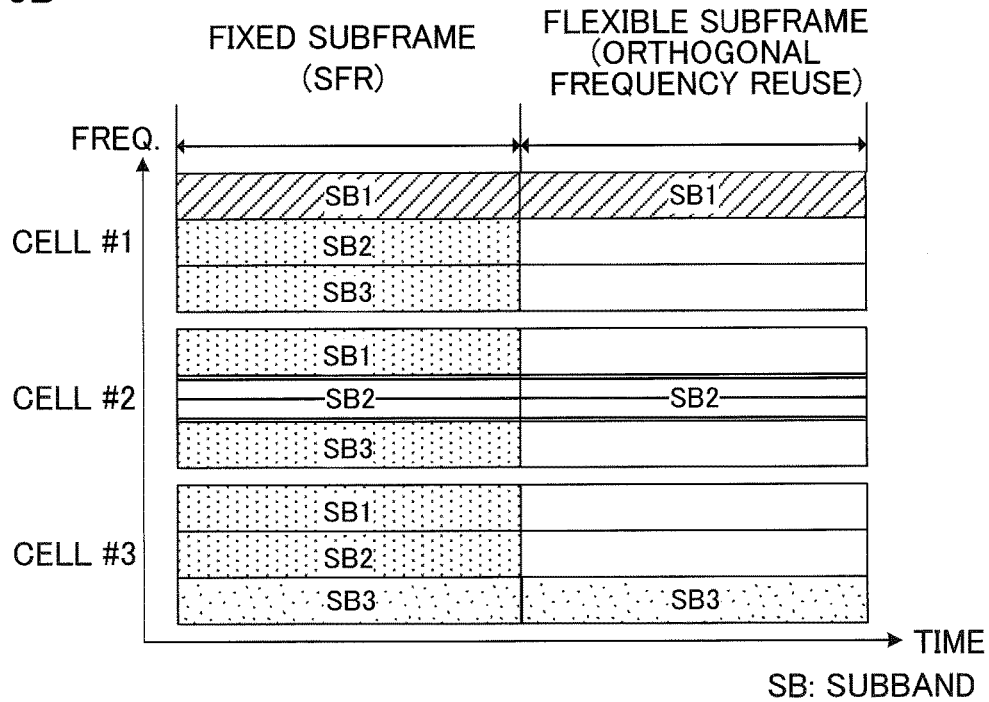

To be more specific, as shown in FIG. 15B, in the fixed subframes, the system band (for example, f1) is divided into a plurality of subbands SB1, SB2 and SB3, and each cell (cell #1 to cell #3) configures the transmission power high in one subband, which varies mutually, and configures the transmission power low in the other subbands. Here, a case is shown where cell #1 configures the transmission power of SB1 higher than the transmission power of SB2 and SB3, cell #2 configures the transmission power of SB2 higher than the transmission power of SB1 and SB3, and cell #3 configures the transmission power of SB3 higher than the transmission power of SB1 and SB2. Meanwhile, in the flexible subframes, frequency regions are allocated so that each cell (cell #1 to cell #3) communicates with the user terminals by using mutually different frequency regions (subbands SB1, SB2 and SB3) (orthogonal frequency reuse).

In this way, soft frequency reuse, which can mitigate interference, and which, furthermore, can improve spectral efficiency to some degree, is applied to the fixed subframes between neighboring cells. Also, orthogonal frequency reuse, which can effectively reduce interference, is applied to the flexible subframes, so that it is possible to reduce interference, and, furthermore, improve spectral efficiency.

<Fifth Example>

A case will be described with a fifth example where (3) soft frequency reuse is applied to the fixed subframes and (2) fractional frequency reuse is applied to the flexible subframes. Note that the descriptions in parts that overlap the first example will be omitted.

Figure 16A:
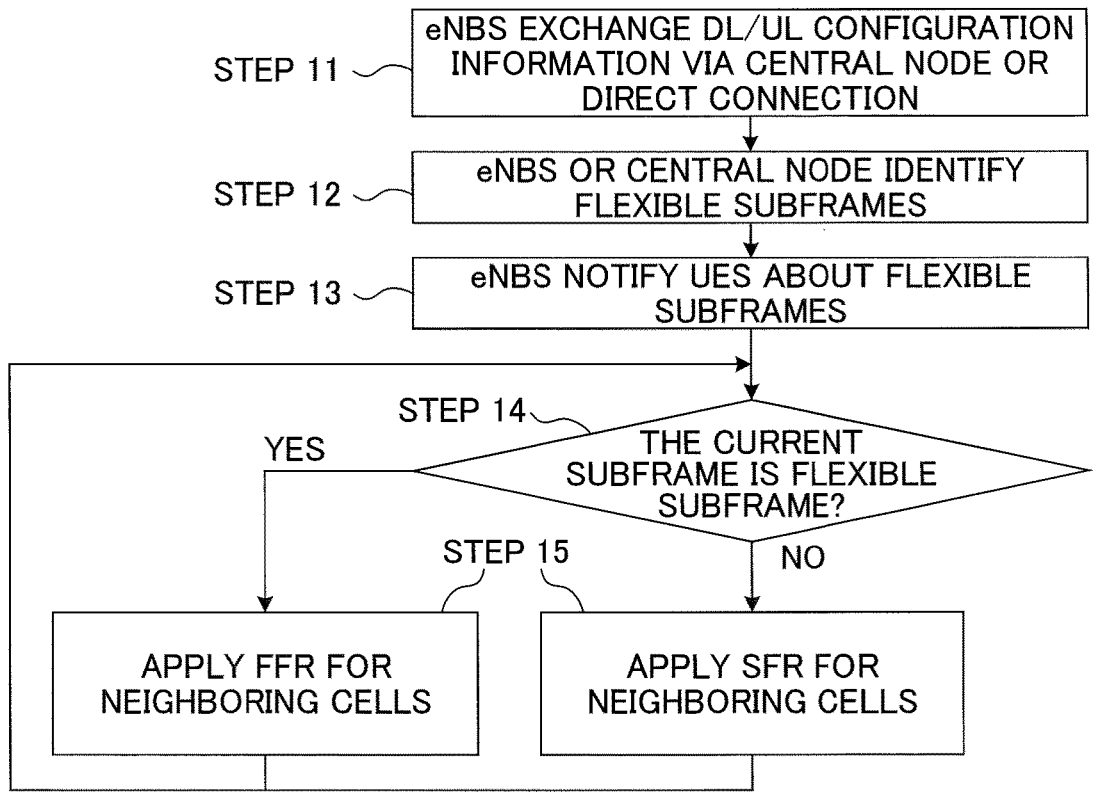
FIG. 16 provides diagrams to show combinations of frequency allocation methods to apply to fixed subframes and flexible subframes (fifth example)

FIG. 16A show an example of a flowchart according to the fifth example. Step 11 to step 14 can be carried out in the same way as in above FIG. 12A. In step 15, each radio base station applies soft frequency reuse to the fixed subframes and applies fractional frequency reuse to the flexible subframes.

Figure 16B:
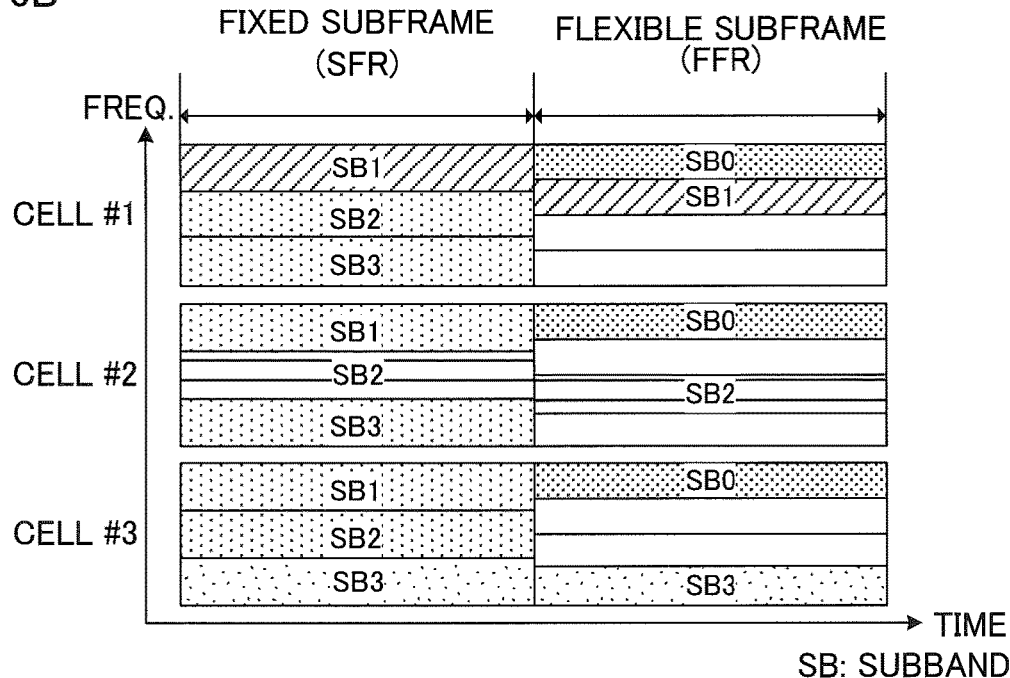

To be more specific, as shown in FIG. 16B, in the fixed subframes, the system band (f1) is divided into a plurality of subbands SB1, SB2 and SB3, and each cell (cell #1 to cell #3) configures the transmission power high in one subband, which varies mutually, and configures the transmission power low in the other subbands. Meanwhile, in the flexible subframes, each cell (cell #1 to cell #3) allocates a frequency region (subband SB0) that is common between the cells to user terminals that are located in the center in each cell, and allocates mutually different frequency regions (subbands SB1, SB2 and SB3) to user terminals that are located on cell edges in each cell.

Also, between SFR and FFR, it is possible to use the same value as a signal intensity threshold for identifying between user terminals that are located in the center in the cells (cell-center UEs) and user terminals that are located on cell edges (cell-edge UEs). By using the same signal intensity threshold, it becomes possible to allow simplified communication control.

In this way, soft frequency reuse, which can mitigate interference, and which, furthermore, can improve spectral efficiency to some degree, is applied to the fixed subframes between neighboring cells. Also, fractional frequency reuse, which can effectively reduce interference, is applied to the flexible subframes, so that it is possible to reduce interference, and, furthermore, improve spectral efficiency.

<Sixth Example>

A case will be described with a sixth example where (3) soft frequency reuse is applied to both the fixed subframes and the flexible subframes. Note that the descriptions in parts that overlap the first example will be omitted.

Figure 17A:
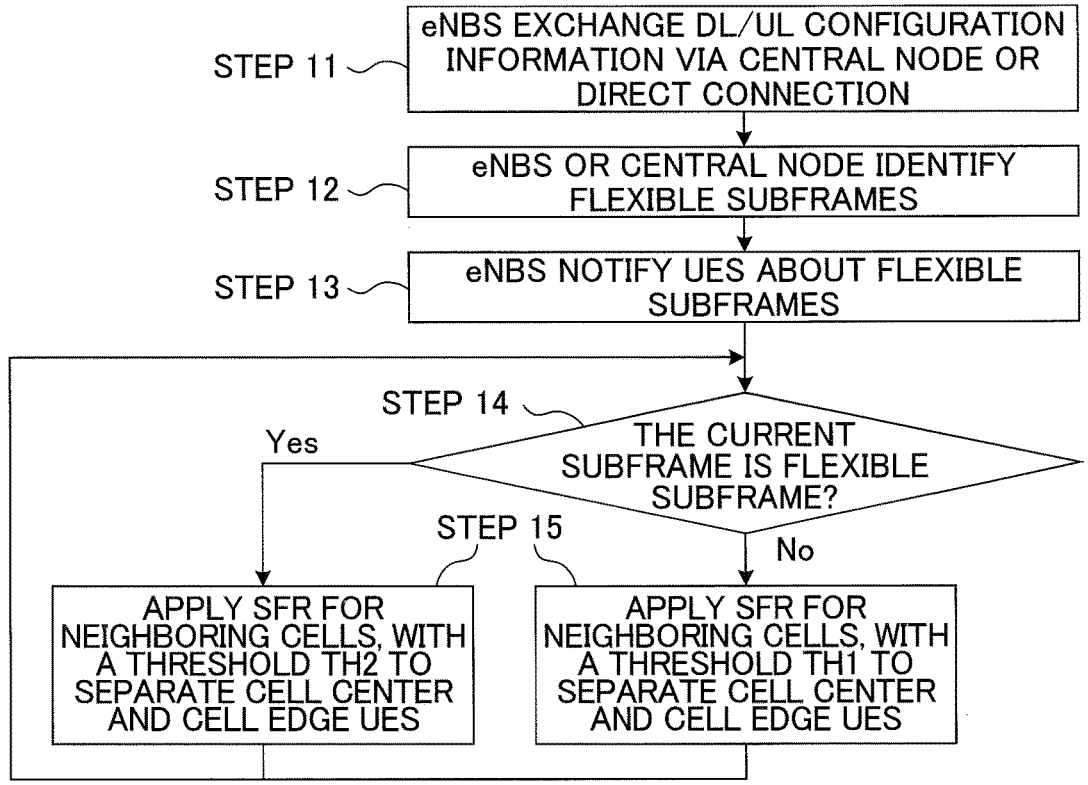
FIG. 17 provides diagrams to show combinations of frequency allocation methods to apply to fixed subframes and flexible subframes (sixth example)
Figure 17B:
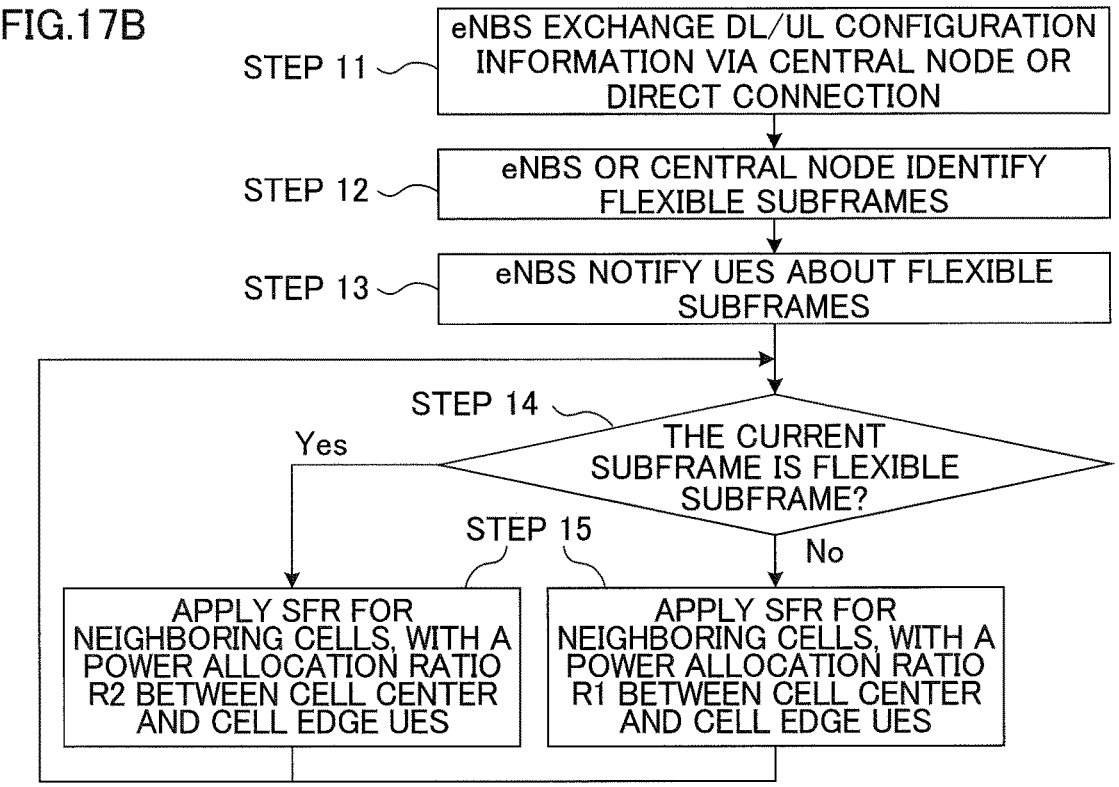

FIGS. 17A and 17B show examples of flowcharts according to the sixth example. Step 11 to step 14 can be carried out in the same way as in above FIG. 12A. In step 15, the neighboring cells apply soft frequency reuse to the fixed subframes and the flexible subframes.

When this takes place, the signal intensity threshold for identifying between user terminals that are located in the center in the cells (cell-center UEs) and user terminals that are located on cell edges (cell-edge UEs) assumes different values between the fixed subframes and the flexible subframes (see FIG. 17A). For example, a threshold Th1 is configured for the fixed subframes and a threshold Th2 (Th1<Th2) is configured for the flexible subframes. Also, it is possible configure a value for one of Th1 and Th2 and an offset value, and define T1 and T2 with these.

In this case, in the fixed subframes, with which the threshold is configured low in comparison with the flexible subframes, it is possible to expand the central region in the cells. That is, compared to the flexible subframes, more terminals can communicate by using a plurality of subbands SB1, SB2 and SB3 in the fixed subframes (see FIG. 18). Note that, in this case, it is preferable to make the transmission power the same between the fixed subframes and the flexible subframes.

Figure 18:
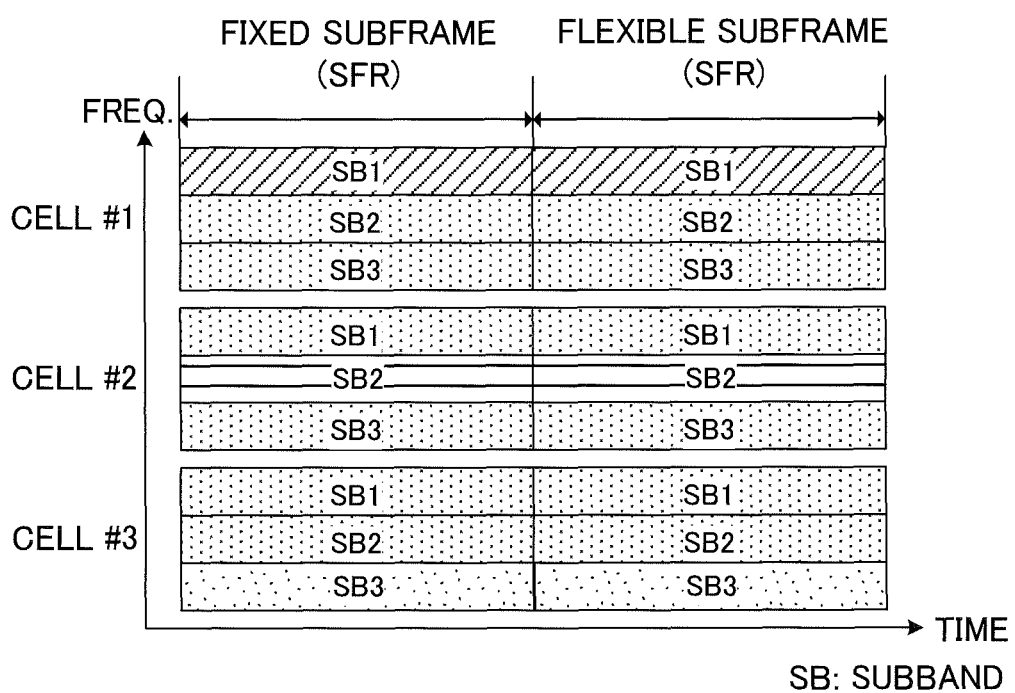
FIG. 18 is a diagram to show combinations of frequency allocation methods to apply to fixed subframes and flexible subframes (sixth example)

Alternatively, the transmission power ratio (for example, the ratio between the transmission power of SB1 and the transmission power of SB2/SB3 in cell #1 in FIG. 18) to apply to user terminals that are located in the center in the cells and user terminals that are located on cell edges may assume different values between the fixed subframes and the flexible subframes (see FIG. 17B). In FIG. 18, the transmission power of SB1 (P1), which is primarily used for cell-edge user terminals, is configured higher than the transmission power of SB2 (P2) and the transmission power of SB3 (P3), which are used primarily for cell-center user terminals. Consequently, when the power ratio R here is defined as R=P2/P1 (or P3/P1), it is possible, for example, to configure a power ratio R1 for the fixed subframes and configure a power ratio R2 (R1>R2) for the flexible subframes. That is to say, compared to the flexible subframes, in the fixed subframes where the power ratio R is larger (closer to 1), the difference between the transmission power of SB1 to use for cell-edge user terminals and the transmission power of SB2/SB3 to use for cell-center user terminals becomes small.

In this case, the power of SB2 and SB3 can be increased in the fixed subframes, which have a large power ratio compared to the flexible subframes. As a result of this, compared to the flexible subframes, in the fixed subframes, more user terminals can communicate by using a plurality of subbands SB1, SB2 and SB3 (see FIG. 18). Note that, in this case, it is preferable to make the signal intensity threshold for identifying between user terminals that are located in the center in the cells and user terminals that are located on cell edges the same between the fixed subframes and the flexible subframes. Also, it is possible to configure a value for one of R1 and R2 and an offset value, and define R1 and R2 with these.

In this way, soft frequency reuse is applied to the fixed subframes and the flexible subframes, and the threshold for identifying between user terminal that are located in the center in the cells and user terminals that are located on cell edges assumes different values between the fixed subframes and the flexible subframes. Alternatively, the power ratio to apply to user terminals that are located in the center in the cell and user terminals that are located on cell edges assumes different values between the fixed subframes and the flexible subframes. By this means, it becomes possible to carry out adequate frequency allocation depending on the interference level in each subframe.

<Seventh Example>

A case will be described with a seventh example where (2) fractional frequency reuse is applied to the fixed subframes and (1) orthogonal frequency reuse is applied to the flexible subframes. Note that the descriptions in parts that overlap the first example will be omitted.

Figure 19A:
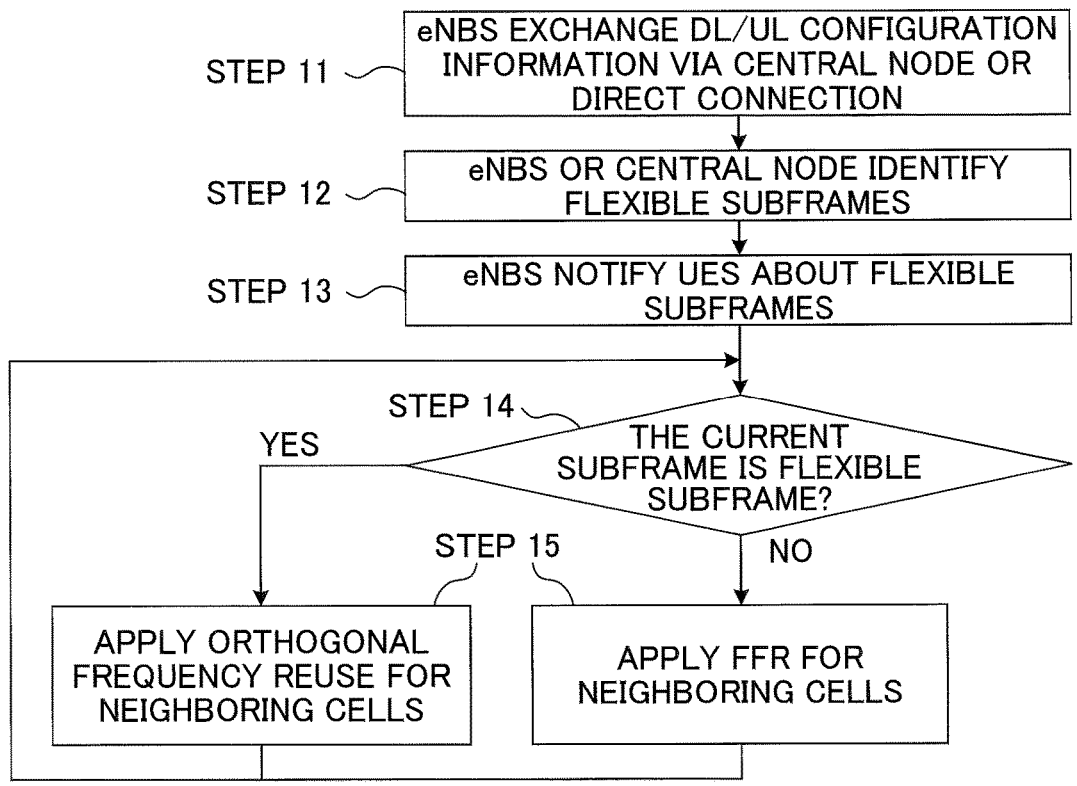
FIG. 19 provides diagrams to show combinations of frequency allocation methods to apply to fixed subframes and flexible subframes (seventh example)

FIG. 19A shows an example of a flowchart according to the seventh example. Step 11 to step 14 can be carried out in the same way as in above FIG. 12A. In step 15, each radio base station applies fractional frequency reuse to the fixed subframes and applies orthogonal frequency reuse to the flexible subframes.

Figure 19B:
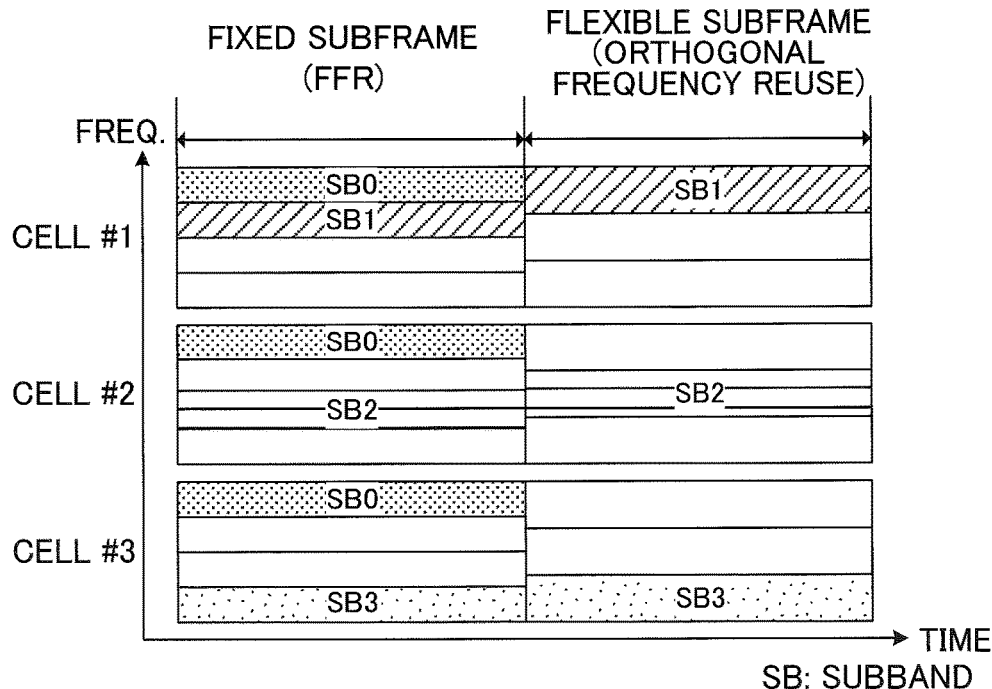

To be more specific, as shown in FIG. 19B, in the fixed subframes, each cell (cell #1 to cell #3) allocates a frequency region (subband SB0) that is common between the cells to user terminals that are located in the center in each cell, and allocates mutually different frequency regions (subbands SB1, SB2 and SB3) to user terminals that are located on cell edges in each cell. Meanwhile, in the flexible subframes, frequency regions are allocated so that each cell (cell #1 to cell #3) communicates with the user terminals by using mutually different frequency regions (subbands SB1, SB2 and SB3) (orthogonal frequency reuse).

In this way, fractional frequency reuse, which can mitigate interference, and which, furthermore, can improve spectral efficiency to some degree, is applied to the fixed subframes between neighboring cells, and orthogonal frequency reuse, which can effectively reduce interference, is applied to the flexible subframes, so that it is possible to reduce interference, and, furthermore, improve spectral efficiency.

<Eighth Example>

A case will be described with an eighth example where (2) fractional frequency reuse is applied to both the fixed subframes and the flexible subframes. Note that the descriptions in parts that overlap the first example will be omitted.

Figure 20A:
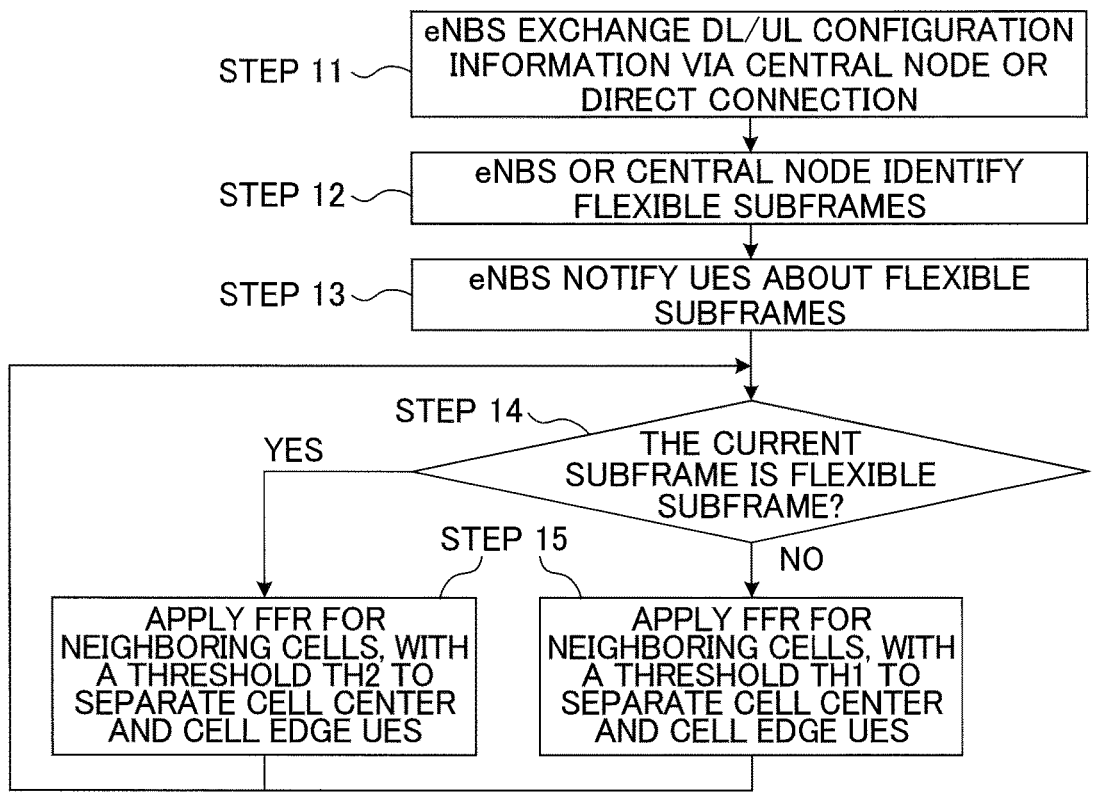
FIG. 20 provides diagrams to show combinations of frequency allocation methods to apply to fixed subframes and flexible subframes (eighth example)

FIG. 20A shows an example of a flowchart according to the eighth example. Step 11 to step 14 can be carried out in the same way as in above FIG. 12A. In step 15, the neighboring cells apply fractional frequency reuse to the fixed subframes and to the flexible subframes.

When this takes place, the signal intensity threshold for identifying between user terminals that are located in the center in the cells (cell-center UEs) and user terminals that are located on cell edges (cell-edge UEs) assumes different values between the fixed subframes and the flexible subframes. For example, a threshold Th1 is configured for the fixed subframes and a threshold Th2 (Th1<Th2) is configured for the flexible subframes. Also, it is possible configure a value for one of Th1 and Th2 and an offset value, and define T1 and T2 with these.

Figure 20B:
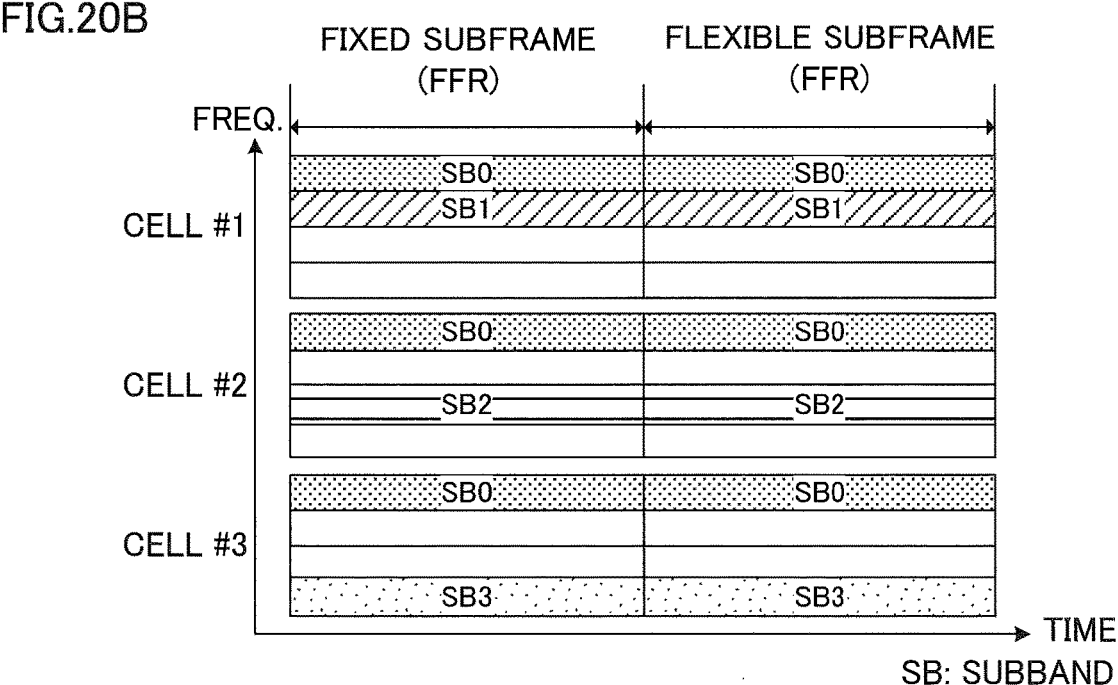

In this case, in the fixed subframes, with which the threshold is configured low in comparison with the flexible subframes, it is possible to expand the central region in the cells. That is, compared to the flexible subframes, more terminals can communicate by using a plurality of subbands in the fixed subframes (see FIG. 20).

In this way, fractional frequency reuse is applied to the fixed subframes and the flexible subframes, and the threshold for identifying between user terminal that are located in the center in the cells and user terminals that are located on cell edges assumes different values between the fixed subframes and the flexible subframes. By this means, it becomes possible to carry out adequate frequency allocation depending on the interference level in each subframe.

As described above, as has been shown above with the first example to the eighth example, it becomes possible to allocate an appropriate frequency to each subframe by applying different frequency allocation methods to subframes that are classified based on the DL/UL configurations employed in each transmitting/receiving point. By this means, even when dynamic TDD is used, it becomes still possible to reduce the interference between radio base stations and between user terminals, and, furthermore, improve spectral efficiency.

Note that, in the above first example to the third example, the allocation of frequency regions in the flexible subframes may be semi-static, may be random (random hopping), or may be dynamic allocation, depending on the amount of traffic, the interference level and so on.

(Embodiment 2)

Cases will be described with embodiment 2 where, when dynamic TDD is employed, frequency regions are allocated to the fixed subframes and the flexible subframes, which are classified in accordance with the DL/UL configurations employed in each transmitting/receiving point, so that interference from other radio base stations is mitigated.

First, each radio base station compares the DL/UL configurations that are employed in the subject apparatus, and the DL/UL configurations that are employed in other radio base stations, and classifies subframes into fixed subframes or flexible subframes (or dynamic subframes). Note that, as for the method of classifying subframes, the same method can be used between embodiment 1 and embodiment 2.

After having determined the type of each subframe, each radio base station allocates frequency regions to the flexible subframes so that interference from other radio base stations is mitigated. For example, when simultaneous transmission/reception of UL and DL is tolerated, the UL carrier and the DL carrier are provided in the flexible subframes. On the other hand, when simultaneous transmission/reception of UL and DL is not tolerated, in the flexible subframes, a predetermined frequency region (carrier or resource block) is made subject to non-transmission, and made orthogonal to other transmitting/receiving points in the frequency domain.

Now, the operation to be assumed when a frequency region allocation method that takes into account interference from other radio base stations is applied to the flexible subframes will be described in detail with reference to the accompanying drawings.

Figure 21A:
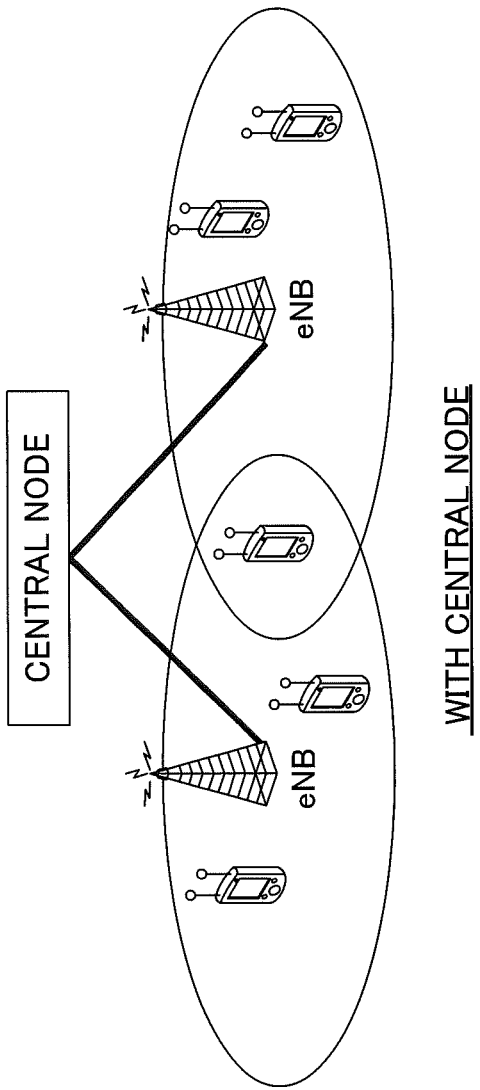
FIG. 21 provides diagrams to show radio communication systems that can be used in embodiment 2.
Figure 21B:
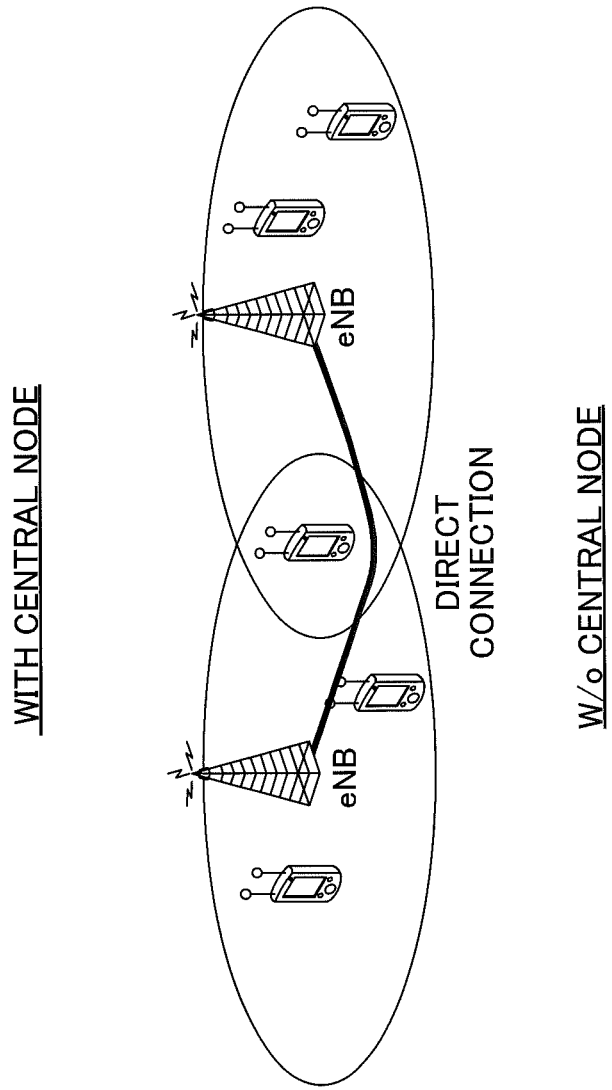

FIG. 21 shows examples of radio communication systems where the present embodiment is employed. FIG. 21A shows a case where control is executed by providing a central control station ("with central node"), and FIG. 21B shows a case where control is executed by connecting between radio base stations (direct connection) without providing a central control station ("without central node").

Figure 22A:
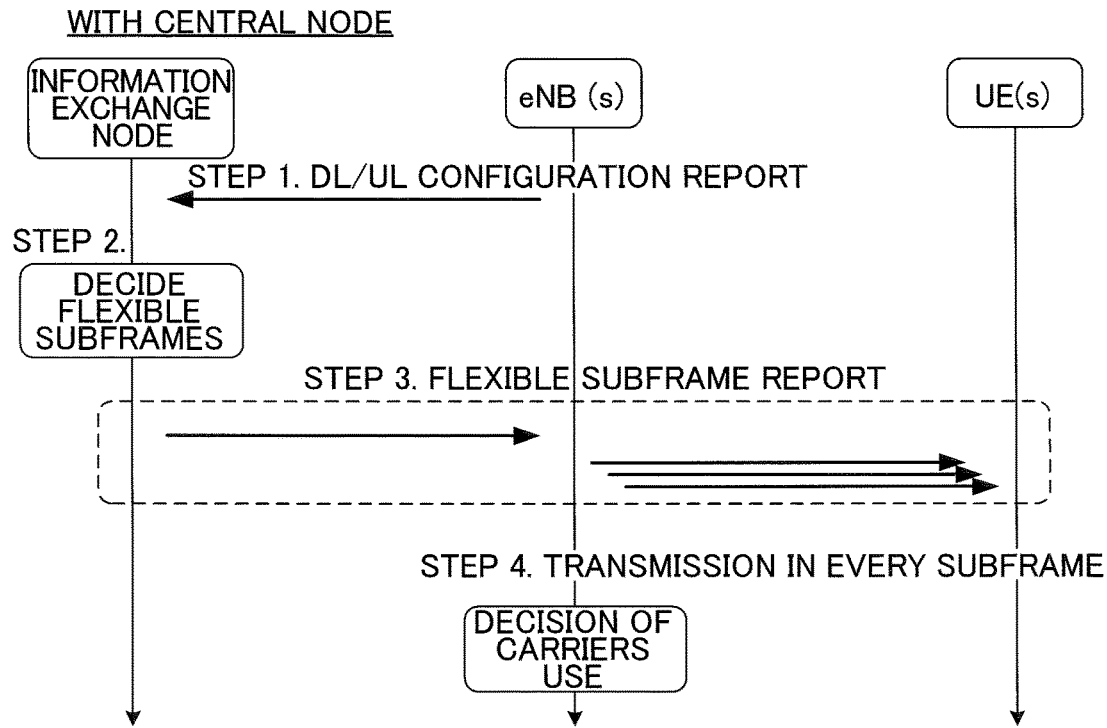
FIG. 22 provides diagrams to show examples of sequence diagrams when the types of subframes and the frequency allocation method are determined based on UL/DL configurations.

FIG. 22A is an example of a sequence diagram when control is executed by providing a central control station (see FIG. 21A). Each radio base station reports the DL/UL configurations to the central control station (information exchange node (central processing node or master eNB)) (step 1). The central control station determines the fixed subframes and the flexible subframes based on the DL/UL configurations reported from each radio base station (step 2).

The central control station reports information related to the flexible subframes (and the fixed subframes) to each radio base station (step 3). Also, each radio base station reports the information reported in relationship to the flexible subframes to user terminals (step 3). The report to the user terminals may be sent by using RRC signaling, broadcast information, downlink control information and so on. Note that, if a user terminal is connected with both a radio base station (for example, a small base station) and the central control station (for example, a macro base station) (dual connection), the information related to the flexible subframes may be reported from the central control station to the user terminal. After that, each radio base station allocates frequency regions to the flexible subframes so that interference from other radio base stations is mitigated (step 4).

Figure 22B:
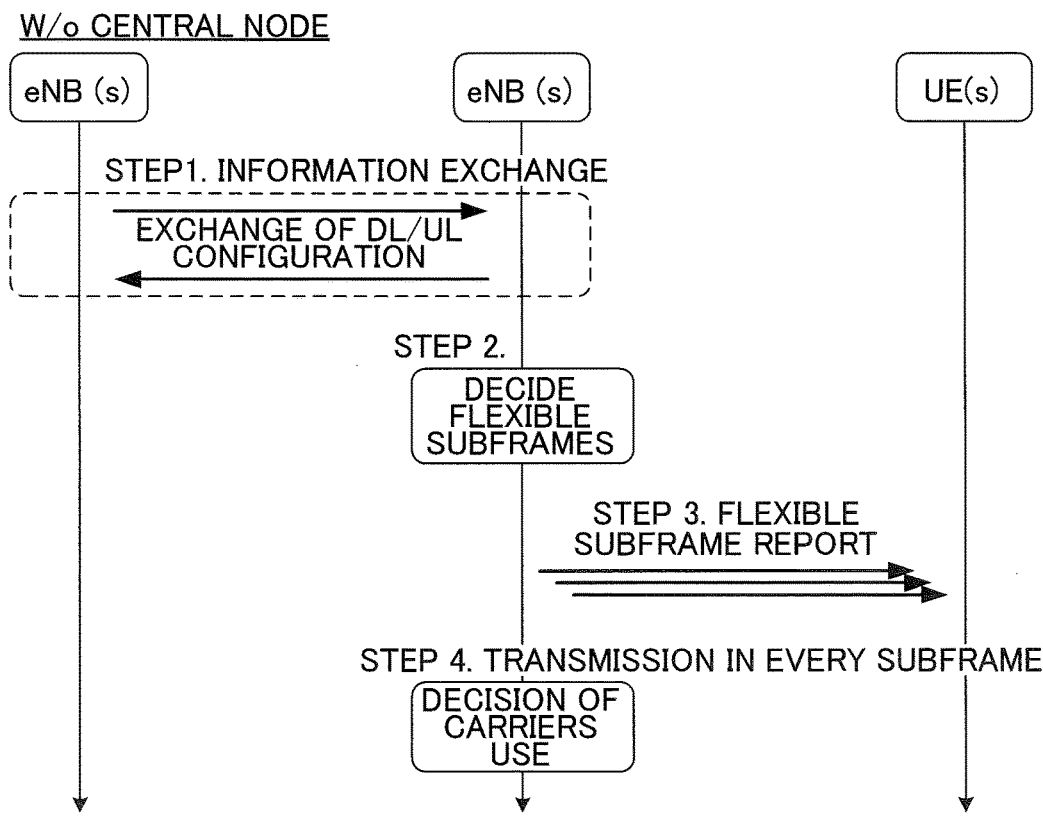

FIG. 22B shows an example of a sequence diagram when control is executed by connecting between the radio base stations without providing a central control station (see FIG. 21B). Each radio base station exchanges information related to DL/UL configurations via direct connection (step 1). Each radio base station determines the fixed subframes and the flexible subframes based on the DL/UL configurations received from other radio base stations (step 2). Each radio base station reports information about the flexible subframes (and the fixed subframes) to the user terminals (step 3). After that, each radio base station allocates frequency regions to the flexible subframes so that interference from other radio base stations is mitigated (step 4).

As step 4 in FIGS. 22A and 22B, in the flexible subframes, each radio base station uses a predetermined frequency region as the UL carrier and uses another carrier as the DL carrier. Meanwhile, in the flexible subframes, each radio base station makes a predetermined frequency region subject to non-transmission and makes it orthogonal to the frequency regions allocated by other radio base stations. Now, the allocation of frequency regions in the flexible subframes will be described below.

<Ninth Example>

A case will be described with a ninth example where simultaneous transmission/reception of UL and DL is tolerated in the flexible subframes, and a predetermined frequency region in the flexible subframes is used as the UL carrier and another carrier is used as the DL carrier.

Figure 23A:
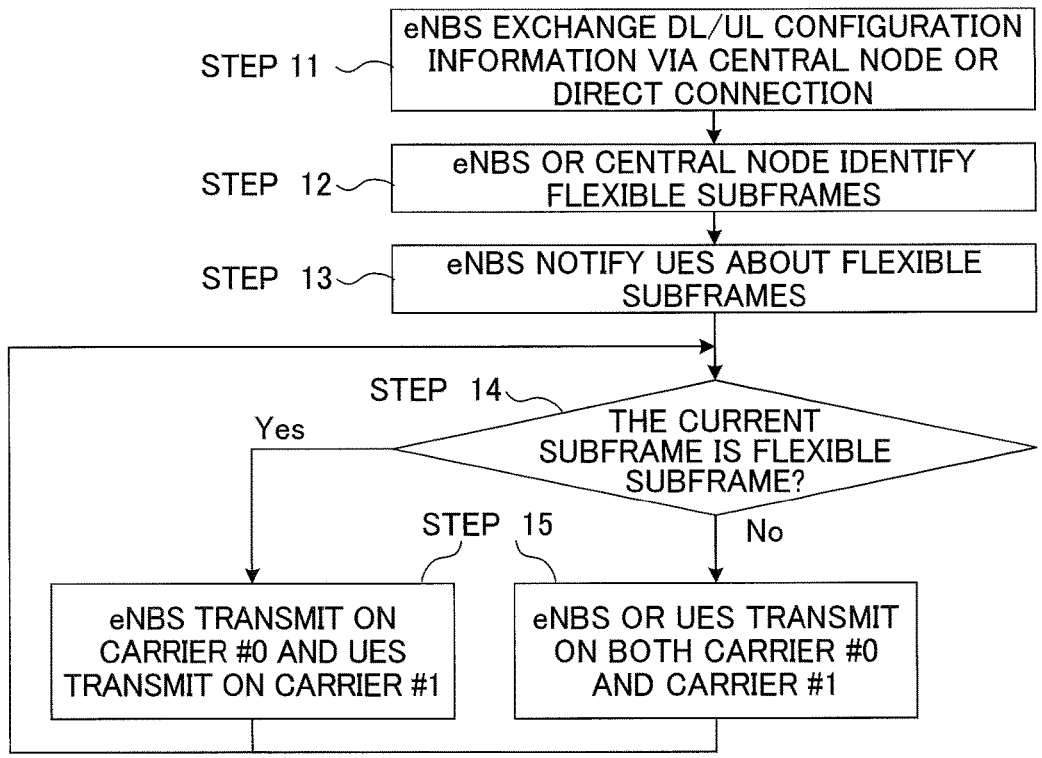
FIG. 23 provides diagrams to show an example of frequency allocation to apply to flexible subframes (ninth example)

FIG. 23A shows an example of a flowchart according to the ninth example. Step 11 to step 14 can be carried out in the same way as in above FIG. 12A. In step 15, each radio base station chooses between TDD and FDD for application, in accordance with the type of subframes.

Figure 23B:
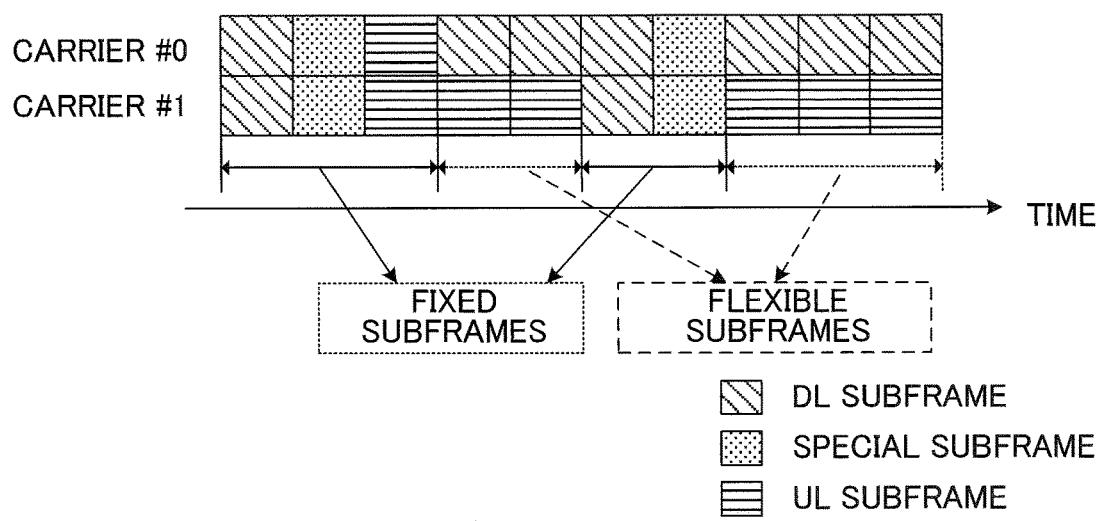

Here, as shown in FIG. 23B, in the flexible subframes, the radio base stations use a predetermined frequency region (for example, carrier #0) as the transmission carrier for the radio base stations (DL carrier). Then, the radio base stations use another frequency region (for example, carrier #1) as the transmission carrier for the user terminals (UL carrier) (FDD). Meanwhile, in the fixed subframes, the radio base stations use carrier #0 and carrier #1 as the transmission carrier for the radio base stations (DL carrier) or the transmission carrier for the user terminals (UL carrier) (TDD). That is, TDD is applied in a wide frequency region in the fixed subframes, and, in the flexible subframes, the mechanism of FDD is used by using a plurality of carriers for varying uses (hybrid TDD/FDD operation).

Figure 24A:
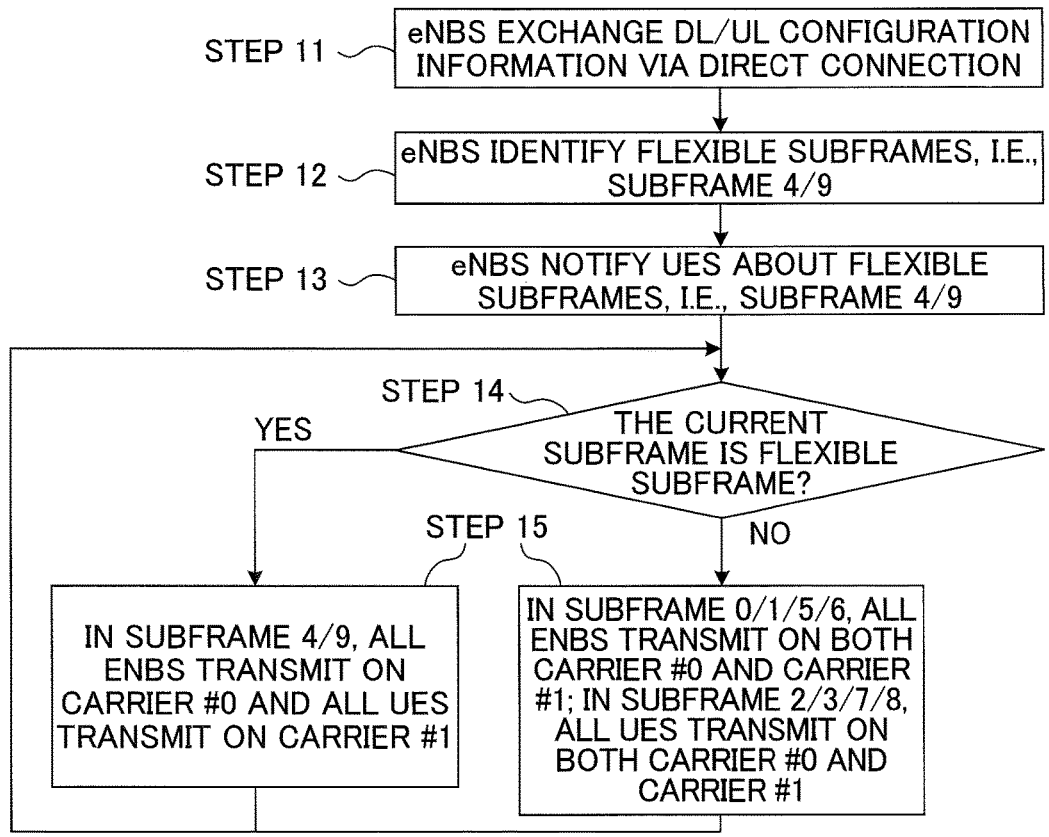
FIG. 24 provides diagrams to show a specific example of frequency allocation to apply to flexible subframes (ninth example)
Figure 24B:
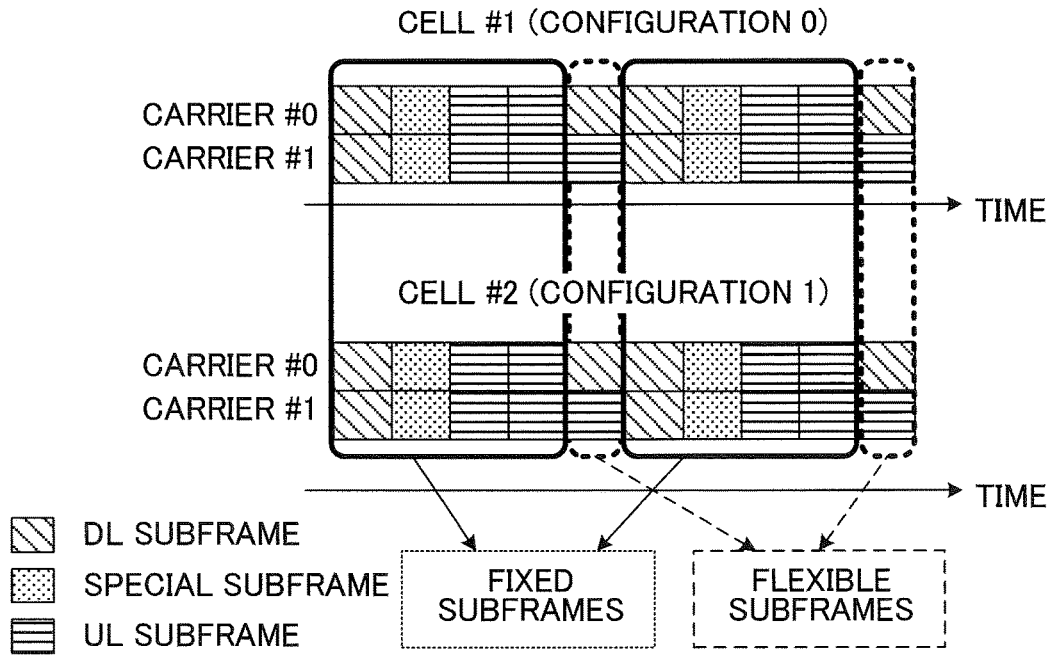

Now, a case where cell #1 employs DL/UL configuration 0 and cell #2 employs DL/UL configuration 1 will be described in detail with reference to FIGS. 24A and 24B.

First, each radio base station exchanges information related to the DL/UL configurations to employ, with other radio base stations (step 11). Note that a case is assumed here where control is executed by connecting between the radio base stations without providing a central control station ("without central node"). Each radio base station defines subframes 4 and 9 as flexible subframes (step 12), taking into account the direction of transmission in each subframe, and reports information about these flexible subframes to the user terminals (step 13).

After that, each radio base station determines the type of subframes (fixed subframes/flexible subframes) to communicate with the user terminals (step 14), and determines the allocation of communicating frequency regions depending on the type of subframes (step 15).

In the flexible subframes (subframes 4 and 9), frequency allocation is carried out so that each radio base station carries out DL transmission using carrier #0, and each user terminal carries out UL transmission using carrier #1 (FDD). Also, frequency allocation is carried out so that each radio base station carries out DL transmission using carriers #0 and #1 in the fixed subframes (subframes 0, 1, 5 and 6) and each user terminal carries out UL transmission using carriers #0 and #1 in the fixed subframes (subframe 2, 3, 7 and 8).

In this way, in the fixed subframes where the direction of transmission in the DL/UL configuration becomes the same between neighboring cells (and where the impact of interference is small), a wide frequency region is configured and TDD is applied. Then, in the flexible subframes where the direction of transmission is likely to differ (and where the impact of interference is large), the DL carrier which each radio base station uses and the UL carrier which each user terminal uses are defined, and FDD is applied. By this means, it is possible to effectively reduce the interference between the radio base stations and between the user terminals, and, furthermore, improve spectral efficiency.

<Tenth Example>

A case will be described here with a tenth example where, when simultaneous transmission/reception of UL and DL is not tolerated in the flexible subframes, a predetermined frequency region is made subject to non-transmission (empty subframe) in the flexible subframes. Note that the descriptions in parts that overlap the ninth example will be omitted.

Figure 25A:
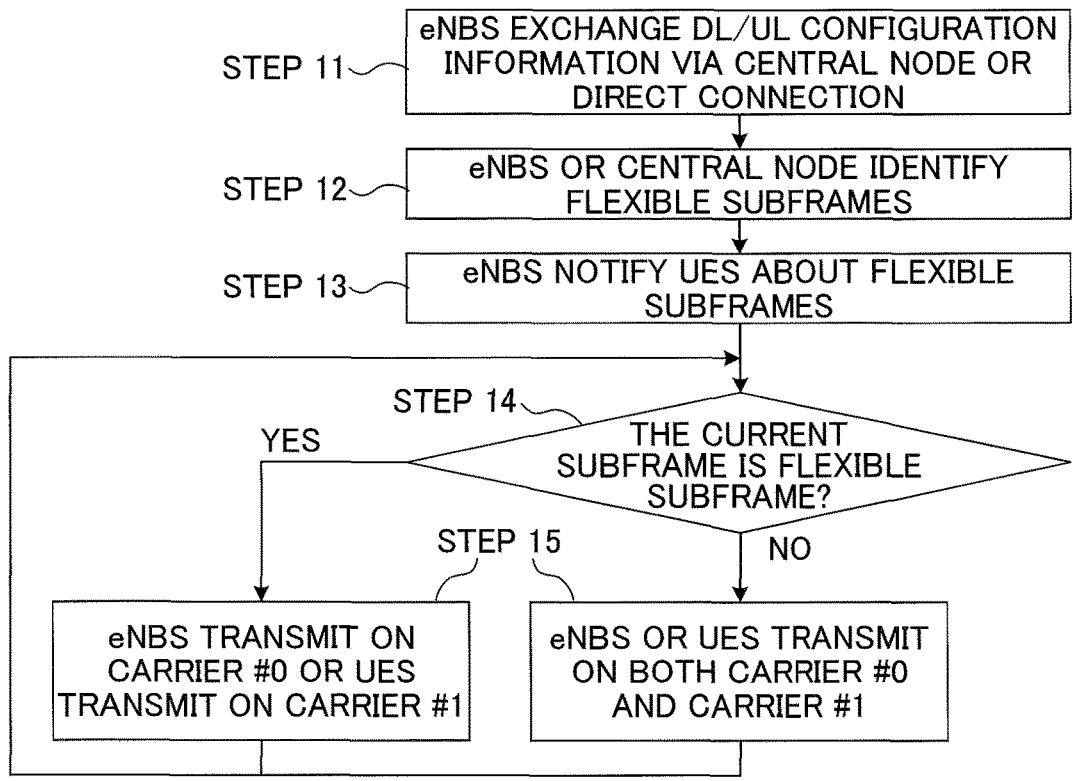
FIG. 25 provides diagrams to show an example of frequency allocation to apply to flexible subframes (tenth example)

FIG. 25A shows an example of a flowchart according to the tenth example. Step 11 to step 14 can be carried out in the same way as in above FIG. 12A. In step 15, each radio base station makes a predetermined frequency region subject to non-transmission, depending on the type of subframes.

Figure 25B:
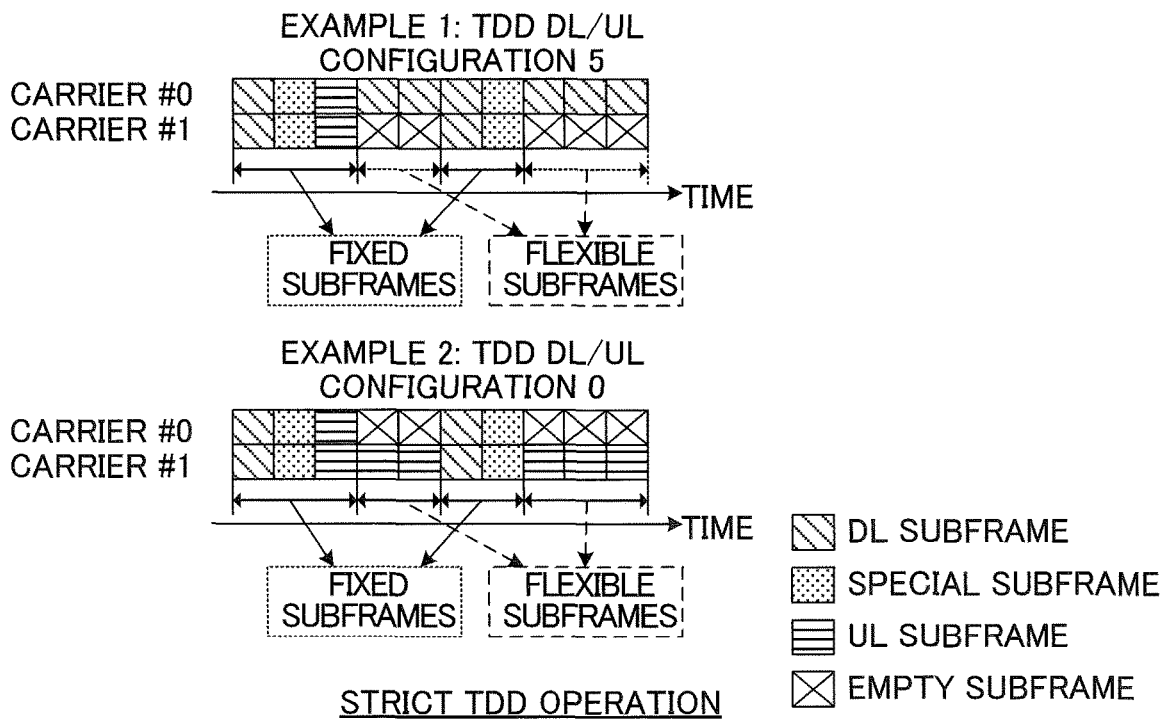

Here, as shown in FIG. 25B, a given radio base station makes a predetermined frequency region (for example, carrier #1) in the flexible subframes subject to non-transmission (empty subframe). Note that the other carrier #0 can employ TDD based on the DL/UL configuration. To be more specific, in the flexible subframes, a radio base station to employ DL/UL configuration 5 makes carrier #1 subject to non-transmission (example 1). Also, another radio base station employing DL/UL configuration 0 makes carrier #0 subject to non-transmission in the flexible subframes (example 2).

Figure 26A:
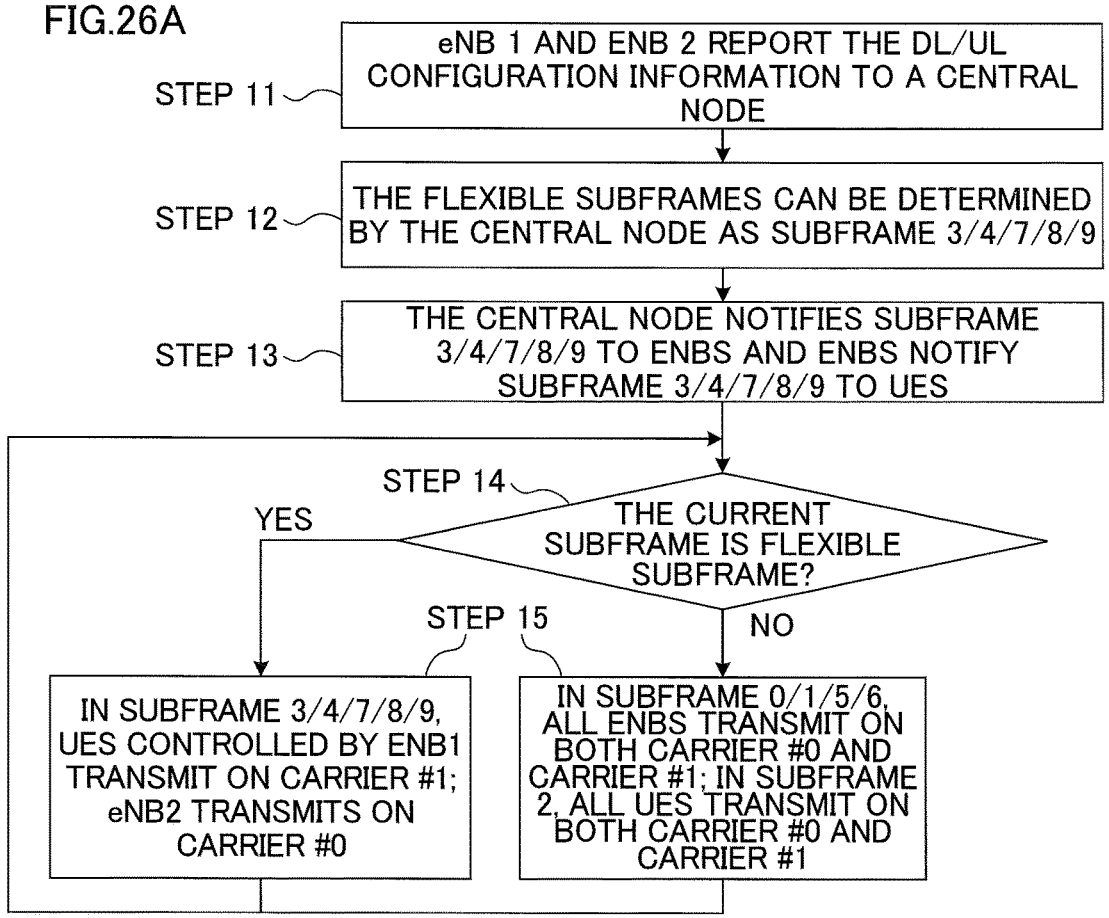
FIG. 26 provides diagrams to show a specific example of frequency allocation to apply to flexible subframes (tenth example)
Figure 26B:
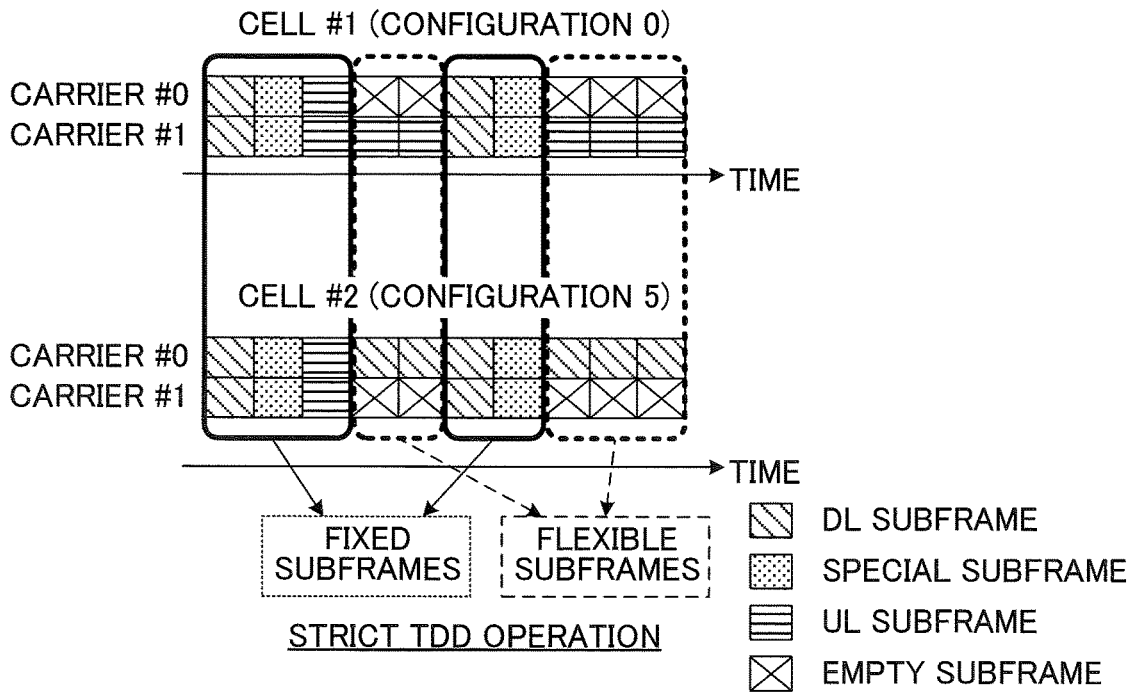

Here, a case will be described in detail where cell 1 employs DL/UL configuration 0 and cell 2 employs DL/UL configuration 5, with reference to FIGS. 26A and 26B.

First, each radio base station (eNB1 and eNB2) reports information related to the DL/UL configurations to employ, separately, to the central control station (step 11). Note that a case is assumed here where a central control station is provided ("with central node"). The central control station defines subframes 3, 4, 7, 8, and 9 as flexible subframes (step 12), and reports information about these flexible subframes to each radio base station (step 13). Also, each radio base station reports the information about the flexible subframes to the serving user terminals.

After that, each radio base station identifies the subframe type (fixed subframe/flexible subframe) of each communicating subframe (step 14), and determines the allocation of frequency regions in accordance with the subframe type (step 15).

In the flexible subframes (subframes 3, 4, 7, 8, and 9), the serving user terminals under the radio base station (eNB1) are controlled to carry out UL transmission via that radio base station, by using carrier #1. Note that, in cell #1, carrier #0 is made subject to non-transmission (empty subframe) in the flexible subframes. Also, another radio base station (eNB2) carries out DL transmission by using carrier #0, and carrier #1 is made subject to non-transmission (empty subframe).

Also, frequency allocation is controlled so that, in the fixed subframes (0, 1, 5 and 6), all the radio base stations carry out DL transmission using carriers #0 and #1, and, in the fixed subframe (subframe 2), all the user terminals carry out UL transmission using carriers #0 and #1.

In this way, in the fixed subframes where the direction of transmission in the DL/UL configuration becomes the same between neighboring cells (and where the impact of interference is small), a wide frequency region is configured and TDD is applied. Then, in the flexible subframes where the direction of transmission is likely to differ (and where the impact of interference is large), a predetermined frequency is made subject to non-transmission, taking into account the interference with other radio base stations. By this means, it is possible to effectively reduce the interference between the radio base stations and between the user terminals, and, furthermore, improve spectral efficiency.

As described above, embodiment 2 provides the steps of classifying subframes into fixed subframes or flexible subframes, based on the relationship between the DL/UL configurations that are employed in a plurality of radio base stations, respectively, applying mutually different frequency allocation methods to the fixed subframes and the flexible subframes, and, in the flexible subframes, part of the frequency band that is used in the fixed subframes is made a DL subframe and another frequency band is made a UL subframe. Alternatively, embodiment 2 may provide the steps of classifying subframes into fixed subframes or flexible subframes, based on the relationship between the DL/UL configurations that are employed in a plurality of radio base stations, respectively, and applying mutually different frequency allocation methods to the fixed subframes and the flexible subframes, and in the flexible subframes, part of the frequency band that is used in the fixed subframes is made subject to non-transmission.

Note that, with embodiment 2, as shown in above FIGS. 10 and 11, it is equally possible to measure the interference level that is received from other radio base stations in each subframe, and determine the frequency allocation to apply to each subframe based on these levels of interference.

(Radio Communication System)

Figure 27:
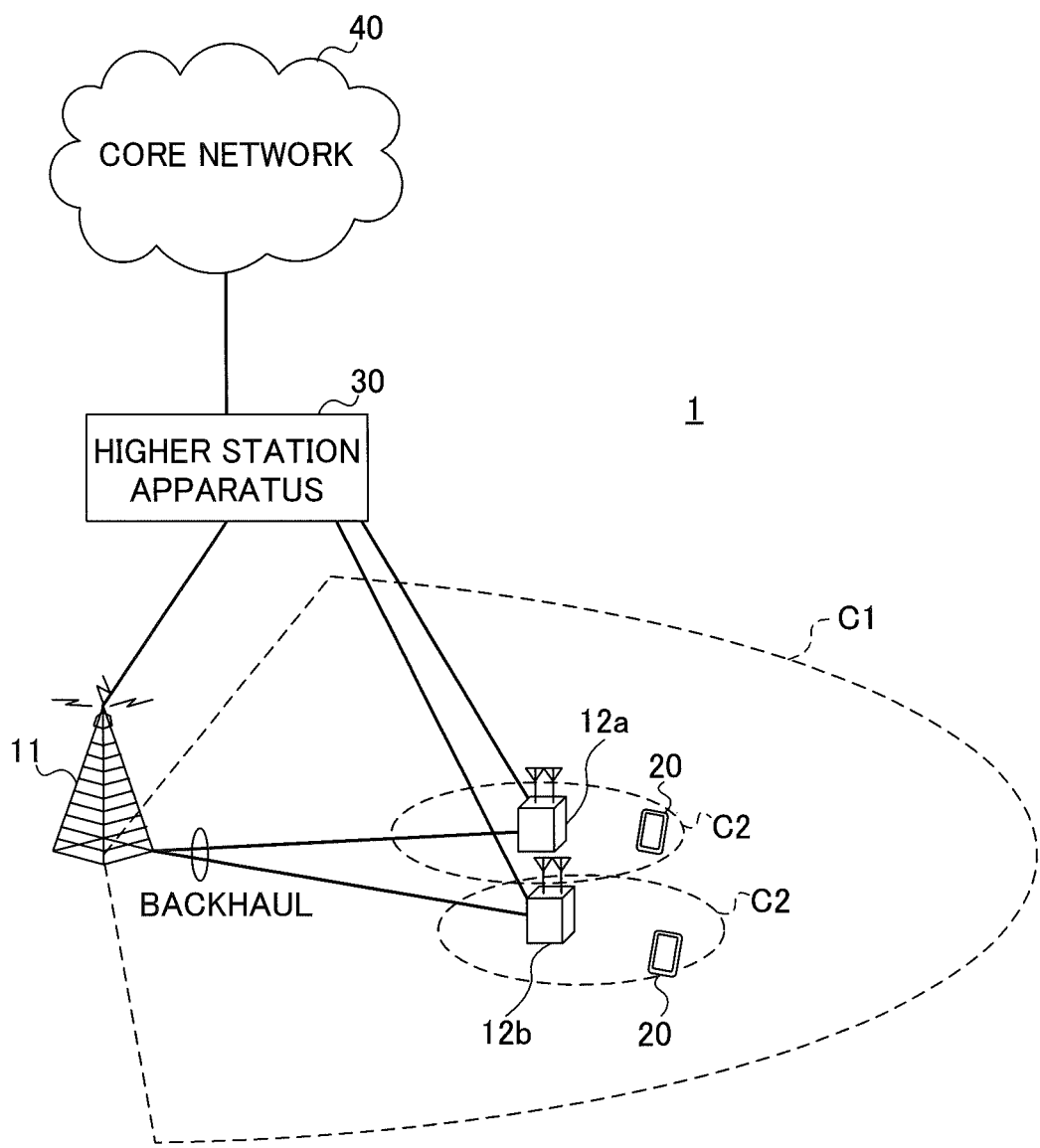
FIG. 27 is a diagram to show an example of a radio communication system according to the present embodiment.

FIG. 27 is a diagram to show a schematic configuration of the radio communication system according to the present embodiment. Note that the radio communication system shown in FIG. 27 is a system to accommodate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G" or "FRA (Future Radio Access)."

The radio communication system 1 shown in FIG. 27 includes a radio base station 11 that forms a macro cell C1, and radio base stations 12a and 12b that form small cells C2, which are placed inside the macro cell C1 and which are narrower than the macro cell C1. Also, in the macro cell C1 and in each small cell C2, user terminals 20 are placed. The user terminals 20 can connect with both the radio base station 11 and the radio base stations 12 (dual connectivity).

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "RRHs (Remote Radio Heads)," "micro base stations," "transmitting/receiving points" and so on. The radio base stations 11 and 12 will be hereinafter collectively referred to as a "radio base station 10," unless distinction needs to be drawn otherwise. The user terminals 20 are terminals to support various communication schemes such as LTE, LTE-A and so on, and may include both mobile communication terminals and fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks, per terminal, and allowing a plurality of terminals to use mutually different bands.

Now, communication channels to be used in the radio communication system shown in FIG. 27 will be described. Downlink communication channels include a PDSCH (Physical Downlink Shared CHannel), which is used by each user terminal 20 on a shared basis, and downlink L1/L2 control channels (a PDCCH, a PCFICH, a PHICH and an enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator CHannel). HARQ ACKs and NACKs for the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink communication channels include the PUSCH (Physical Uplink Shared CHannel), which is used by each user terminal 20 on a shared basis as an uplink data channel, and the PUCCH (Physical Uplink Control CHannel), which is an uplink control channel. User data and higher control information are transmitted by this PUSCH. Also, downlink radio quality information (CQI: Channel Quality Indicator), ACKs/NACKs and so on are transmitted by the PUCCH.

Figure 28:
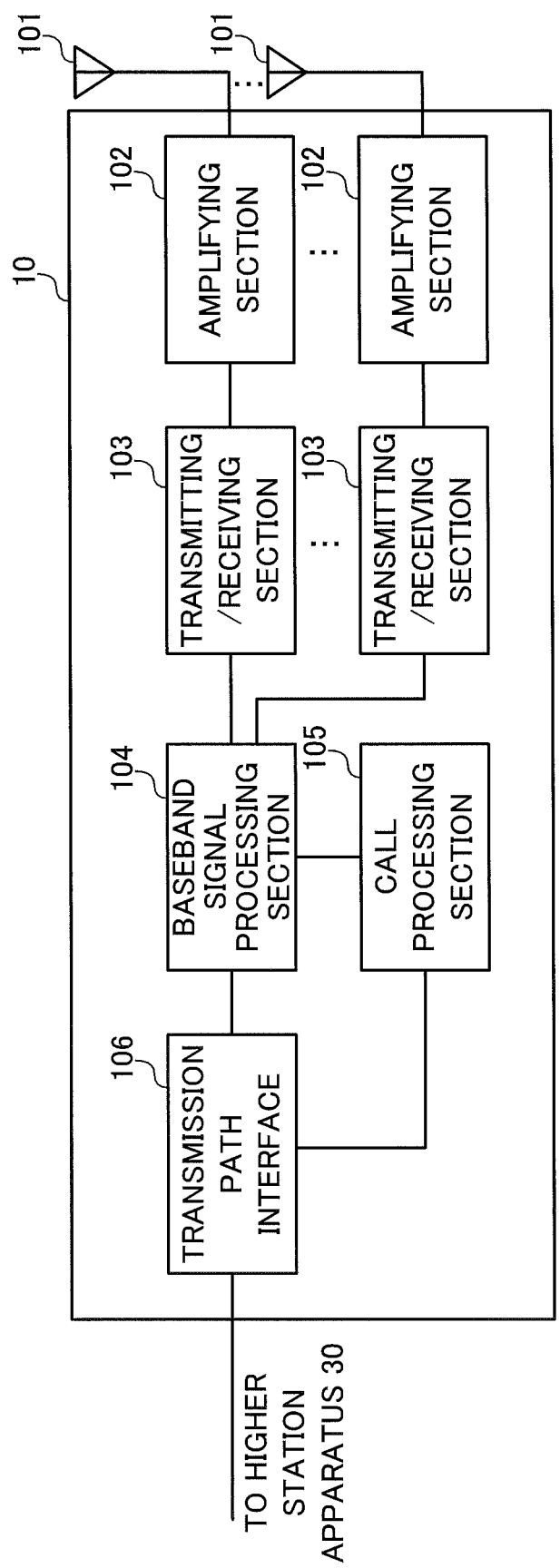
FIG. 28 is a diagram to explain an overall structure of a radio base station.

FIG. 28 is a diagram to show an overall structure of a radio base station 10 (which covers the radio base stations 11 and 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to user terminals 20 on the downlink is input from the higher station apparatus 30, into the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminals 20, control information for allowing communication in the cell, through a broadcast channel. The information for allowing communication in the cell includes, for example, the uplink or downlink system bandwidth and so on. Also, the above-noted information related to subframe types (fixed subframes/flexible subframes) may be reported to the user terminals using a broadcast channel. Note that, if a user terminal is connected with both the radio base station 11 and a radio base station 12 (dual connection), it is equally possible to report the information related to the types of subframes from the radio base station 12, which functions as a central control station, to the user terminal, by using a broadcast channel.

Each transmitting/receiving section 103 converts baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for data that is transmitted from the user terminals 20 to the radio base station 10 on the uplink, the radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 29:
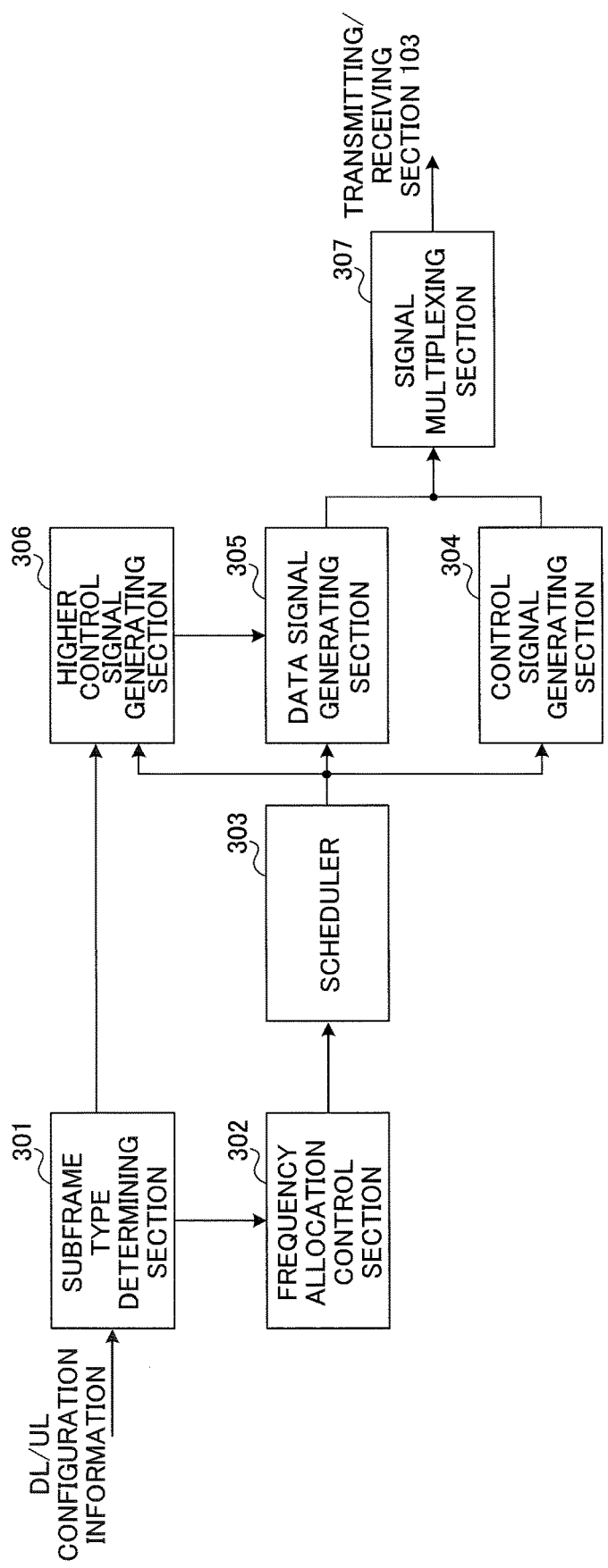
FIG. 29 is a functional block diagram that corresponds to a baseband processing section in a radio base station.

FIG. 29 is a functional configuration diagram of the baseband signal processing section 104 provided in the radio base station 10 according to the present embodiment, and part of the higher layers. Note that, although FIG. 29 primarily shows downlink (transmitting) functional configurations, the radio base station 10 may have uplink (receiving) functional configurations as well.

As shown in FIG. 29, the baseband signal processing section 104 provided in the radio base station 10 is formed by including a subframe type determining section 301, a frequency allocation control section 302, scheduler 303, a control signal generating section 304, a data signal generating section 305, a higher control signal generating section 306 and a signal multiplexing section 307.

The subframe type determining section 301 determines the type of each subframe. For example, the subframe type determining section 301 classifies subframes into fixed subframes or flexible subframes, based on the relationship in terms of the direction of transmission in each subframe in the DL/UL configurations that are employed in other radio base stations.

Note that, when information related to the DL/UL configurations in each radio base station 12 is exchanged via a central control station (for example, the radio base station 11) ("with central node"), the subframe type determining section 301 in each radio base station 12 identifies the type of each subframe based on the information reported from the central control station. In this case, each radio base station 12 reports the DL/UL configuration to employ, in advance, to the central control station.

On the other hand, when control is executed by connecting between radio base stations 12 without providing a central control station (direct connection) ("without central node"), the subframe type determining section 301 in each radio base station 12 determines the type of each subframe based on information reported from other radio base stations. In this case, each radio base station 12 reports the DL/UL configuration that is employed in the subject apparatus, in advance, to the other radio base stations.

The frequency allocation control section 302 applies suitable frequency allocation methods, separately, in accordance with the type of each subframe determined in the subframe type determining section 301 (fixed subframes/flexible subframes). For example, as has been shown earlier with embodiment 1, the frequency allocation control section 302 preferentially applies a frequency allocation method that improves spectral efficiency to the fixed subframes in which the impact of interference is small, and preferentially applies a frequency allocation method with a high interference mitigation effect to the flexible subframes in which the impact of interference is large. To be more specific, ones from the first example to the eighth example above can be applied as the frequency allocation methods for the fixed subframes and the flexible subframes.

Also, as has been shown earlier with the second embodiment, the frequency allocation control section 302 provides the UL carrier and the DL carrier in the flexible subframes when simultaneous transmission/reception of UL and DL is tolerated (ninth example). On the other hand, if simultaneous transmission/reception of UL and DL is not tolerated, a predetermined frequency region (carrier or resource block) is made subject to non-transmission in the flexible subframes, and is made orthogonal to other transmitting/receiving points in the frequency domain (tenth example).

Note that the frequency allocation control section 302 may determine the frequency allocation method (frequency reuse schemes) to apply to each subframe, based on the interference level that is received from other radio base stations in each subframe. In this case, a configuration in which a measurement section to measure the interference level is newly provided, or a configuration in which the subframe type determining section 301 measures the interference level from each radio base station and determines the type of each subframe may be possible.

The scheduler 303 controls the scheduling for each user terminal in accordance with the frequency allocation methods determined in the frequency allocation control section 302. Note that the functions of the frequency allocation control section 302 may be included in the scheduler 303.

The higher control signal generating section 306 generates higher control signals, which include information representing the type of each subframe (fixed subframes or flexible subframes) and so on. The higher control signals that are generated in the higher control signal generating section 306 are output to the data signal generating section 305, embedded in the data signal (PDSCH), and transmitted by way of RRC signaling. Also, the information regarding the type of each subframe may be reported to the user terminals as bitmap information. Also, it is equally possible to report the type of each subframe to the user terminals, in advance, by preparing a plurality of patterns, by using RRC and so on.

The control signal generating section 304 generates control signals for the user terminals 20, the allocation of which to each subframe is determined in the scheduler 303. Also, the control signal generating section 304 is also able to include and transmit the information that represents the type of each subframe (fixed subframe or flexible subframe) in a downlink control signal. Also, when the type of each subframe is reported to the user terminals, in advance, by preparing a plurality of patterns, it is possible to include and transmit bit information, which selects a specific pattern from a plurality of subframe type patterns, in a downlink control signal.

Note that, when a user terminal is connected with both the radio base station 11 and a radio base station 12 (dual connection), it is equally possible to report the information related to the types of subframes from the radio base station 12, which functions as a central control station, to the user terminal, by using a higher control signal (for example, RRC), a downlink control signal and so on.

The data signal generating section 305 generates data signals (PDSCH) for the user terminals 20, the allocation of which to each subframe is determined in the scheduler 303. The data signals generated in the data signal generating section 305 include higher control signals (for example, the information related to the type of each subframe (fixed subframe/flexible subframe) and so on) that are generated in the higher control signal generating section 306.

The signal multiplexing section 307 multiplexes the control signals generated in the control signal generating section 304, the data signals generated in the data signal generating section 305, and reference signals generated in an unillustrated reference signal generating section, and generates transmission signals. The transmission signals generated in the signal multiplexing section 307 are output to the transmitting/receiving sections 103, and transmitted to the user terminals 20 via the amplifying sections 102 and the transmitting/receiving antennas 101.

Figure 30:
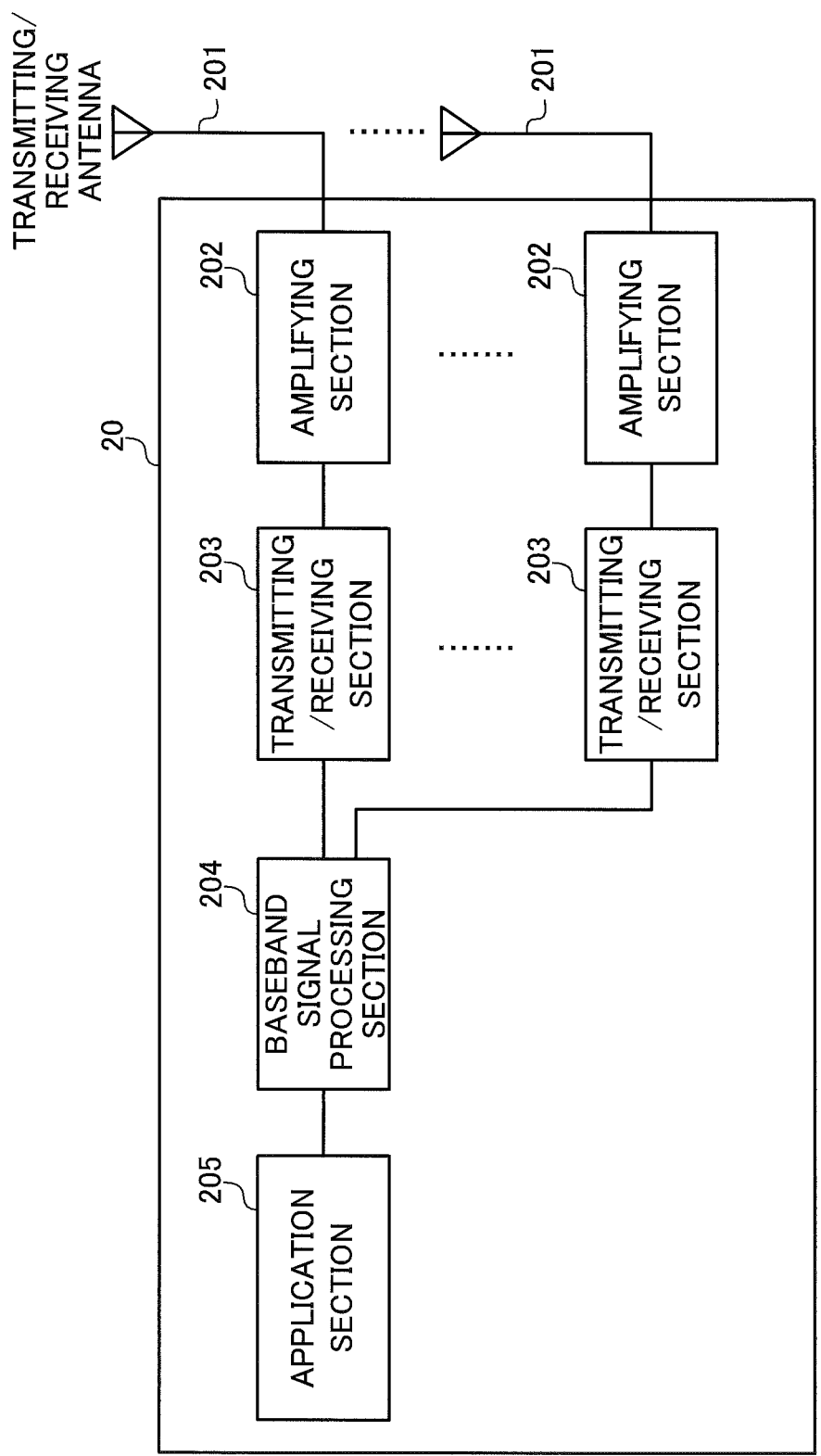
FIG. 30 is a diagram to explain an overall structure of a user terminal.

FIG. 30 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving sections 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201. The transmitting/receiving sections 203 function as receiving sections to receive the information related to the types of subframes that is reported from the radio base stations and so on.

Figure 31:
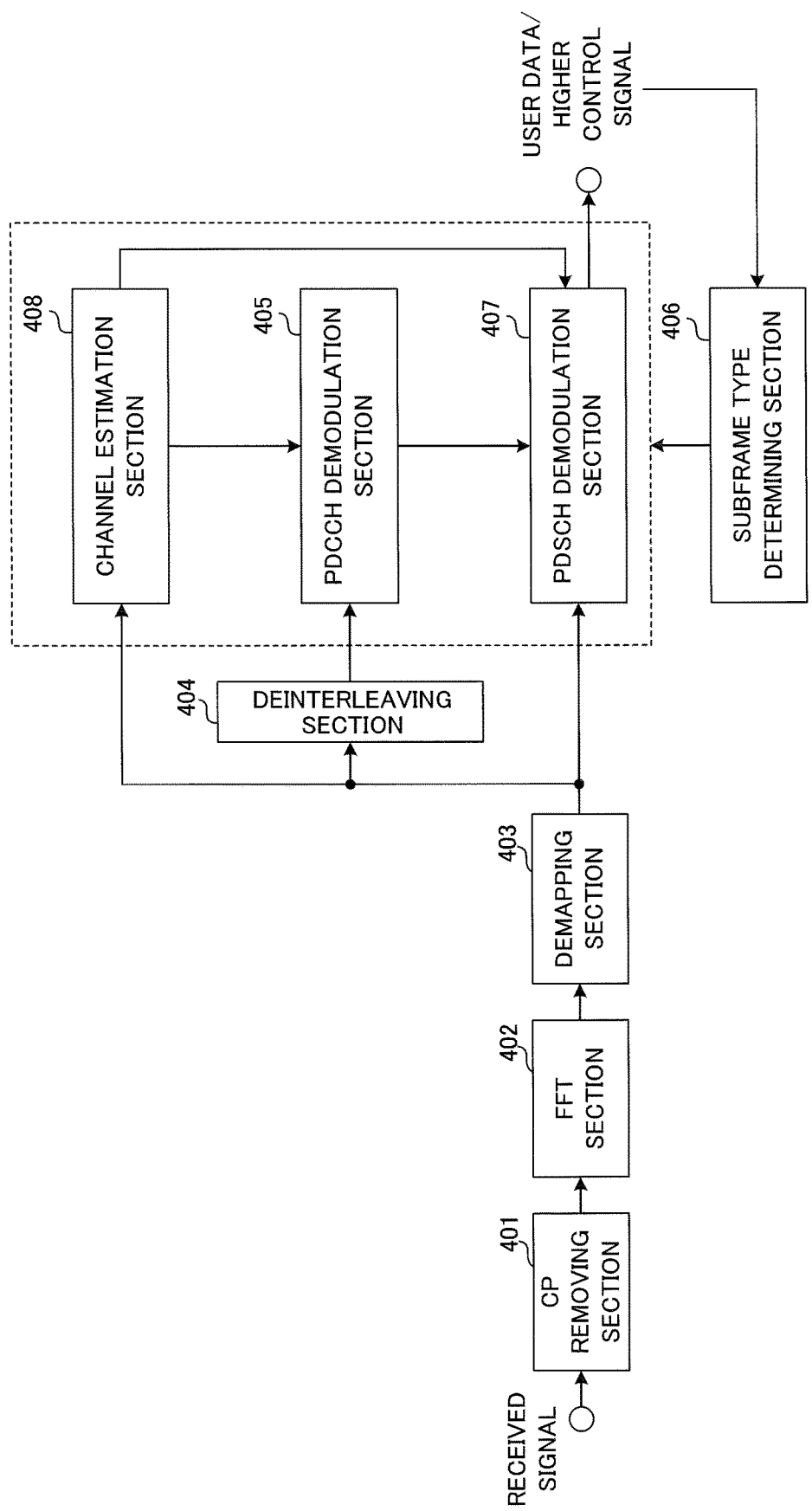
FIG. 31 is a functional block diagram that corresponds to a baseband processing section in a user terminal.

FIG. 31 is a functional configuration diagram of the baseband signal processing section 204 provided in the user terminal 20. The user terminal 20 has a CP removing section 401, an FFT section 402, a demapping section 403, a deinterleaving section 404, a PDCCH demodulation section 405, a subframe type determining section 406, a PDSCH demodulation section 407 and a channel estimation section 408, as downlink (receiving) functional configurations.

Downlink signals that are received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) on the downlink signals, converts the time domain signals into frequency domain signals, and inputs these signals in the demapping section 403. The demapping section 403 demaps the downlink signals. Note that the demapping process by the demapping section 403 is performed based on higher layer control information that is received as input from the application section 205. Downlink control information that is output from the demapping section 403 is deinterleaved in the deinterleaving section 404.

The PDCCH demodulation section 405 performs blind decoding, demodulation, channel decoding and so on of the downlink control information (DCI) that is output from the deinterleaving section 404, based on the result of channel estimation in the channel estimation section 408, which will be described later.

The subframe type determining section 406 determines the type of each subframe (or the frequency allocation method that is employed in each subframe), based on information related to the type of each subframe (fixed subframe/flexible subframe) received from the radio base station. By this means, even when different frequency allocation methods are applied to each subframe, the user terminal can still specify the frequency region that is employed in each subframe, and so on. Processing sections including the PDCCH demodulation section 405, the PDSCH demodulation section 407 and others can process received signals based on the type of each subframe.

Note that, although FIG. 31 illustrates a case where the subframe type determining section 406 makes decisions based on subframe type information that is received via RRC signaling, this is by no means limiting. If the subframe type information is included in downlink control information, it is equally possible to determine the type (or the frequency allocation method) of each subframe based on information that is output from the PDCCH demodulation section 405. Alternatively, the subframe type determining section 406 may determine the type (or the frequency allocation method) of each subframe based on both RRC signaling and downlink control information.

The PDSCH demodulation section 407 performs demodulation, channel decoding and so on of the downlink data that is output from the demapping section 403, based on the result of channel estimation in the channel estimation section 408. To be more specific, the PDSCH demodulation section 407 demodulates the PDSCH allocated to the subject terminal based on the downlink control information that is demodulated in the PDCCH demodulation section 405, and acquires the downlink data (downlink user data and higher layer control information) for the subject terminal.

The channel estimation section 408 performs channel estimation using demodulation reference signals (DM-RSs), measurement reference signals (CRSs and CSI-RSs) and so on. The channel estimation section 408 outputs the result of channel estimation by the measurement reference signals (CRSs and CSI-RSs) to the PDCCH demodulation section 405. Meanwhile, the channel estimation section 408 outputs the result of channel estimation by the demodulation reference signals (DM-RSs) to the PDSCH demodulation section 407.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Also, a plurality of examples described above may be combined and implemented as appropriate. For example, as for the method of reporting signals and so on, it is equally possible to employ methods that have been described as differing embodiments. Consequently, the descriptions herein are provided only for the purpose of explaining examples, and should by no means be construed to limit the present invention in any way.

The disclosure of Japanese Patent Application No. 2013-045868, filed on Mar. 7, 2013, including the specification, drawings and abstracts, is incorporated herein by reference in its entirety.

The invention claimed is:

1. A user terminal that communicates with a radio base station via time division duplex, the user terminal comprising:
   a receiver that receives information related to subframes; and
   a transmitter that transmits a signal with a transmission power that is set based on the information related to the subframes, wherein
   mutually different frequency allocation methods are applied to fixed subframes, each of which is transmitted in the same direction between different transmitting/receiving points, and flexible subframes, each of which is transmitted in different directions between the transmitting/receiving points.

2. The user terminal according to claim 1, wherein the information related to the subframes is bitmap-format information.

3. The user terminal according to claim 1, wherein the transmitter transmits the signal using the transmission power that is different between fixed subframes and flexible subframes.

4. The user terminal according to claim 3, wherein the transmitter transmits the signal using the transmission power that is different between subframes 0, 1, 2, 5 and 6 and subframes 3, 4, 7, 8 and 9.

5. The user terminal according to claim 1, wherein in a fixed subframe, the user terminal communicates with the radio base station in a given frequency region that is common between user terminals in a cell formed by the radio base station.

6. The user terminal according to claim 5, wherein in a fixed subframe, the user terminal communicates with the radio base station in a different frequency region from a frequency region that is used in a flexible subframe in the cell.

7. The user terminal according to claim 1, wherein the receiver receives downlink data, and the downlink data is scheduled in the radio base station based on information related to a downlink/uplink configuration reported from another radio base station.

8. The user terminal according to claim 1, wherein soft frequency reuse is applied to the fixed subframes and fractional frequency reuse is applied to the flexible subframes.

9. The user terminal according to claim 1, wherein the fixed subframes and flexible subframes are determined based on a direction of transmission in each subframe, and the fixed subframes are subframes including subframes 0, 1, 2, 5 and 6, and the flexible subframes are any subframes of subframes 3, 4, 7, 8 and 9.

10. A radio base station that communicates with a user terminal via time division duplex, the radio base station comprising:
    a transmitter that transmits information related to subframes; and
    a receiver that receives a signal that is transmitted with a transmission power set based on the information related to the subframes,
    wherein mutually different frequency allocation methods are applied to fixed subframes, each of which is transmitted in the same direction between different transmitting/receiving points, and flexible subframes, each of which is transmitted in different directions between the transmitting/receiving points.

11. The radio base station according to claim 10, further comprising:
    a transmission path interface that receives information related to a downlink/uplink configuration from another radio base station; and
    a scheduler that controls scheduling of the user terminal based on the information related to the downlink/uplink configuration.

12. A radio communication method for a radio base station and a user terminal that communicate with each other, the radio communication method comprising:
    receiving, by the user terminal, information related to subframes; and
    transmitting, by the user terminal, a signal with a transmission power that is set based on the information related to the subframes, wherein
    mutually different frequency allocation methods are applied to fixed subframes, each of which is transmitted in the same direction between different transmitting/receiving points, and flexible subframes, each of which is transmitted in different directions between the transmitting/receiving points.

* * * * *